US012792765B1

(12) United States Patent
Mavaddat et al.

(10) Patent No.: US 12,792,765 B1
(45) Date of Patent: Nov. 10, 2026

(54) GENERATING SEMI-DATA-BLIND DATA-CLASS FOOT-PRINTS TO IMPROVE SYSTEM SECURITY

(71) Applicant: Amazon Technologies, Inc., Seattle, WA (US)

(72) Inventors: Matin Mavaddat, Oxford (GB); Adam Kilpatrick, Austin, TX (US); Jessica Erin Clark, Seattle, WA (US); Jessica Curry, Seattle, WA (US); Nathan David Venckus, Seattle, WA (US); Sri Harsha Modali, Seattle, WA (US); Jason Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 18/622,710

(22) Filed: Mar. 29, 2024

(51) Int. Cl.
*G06F 21/62* (2013.01)
*G06N 5/04* (2023.01)

(52) U.S. Cl.
CPC ........... *G06F 21/6227* (2013.01); *G06N 5/04* (2013.01)

(58) Field of Classification Search
CPC .............................. G06F 21/6227; G06N 5/04
USPC ............................................................ 726/26
See application file for complete search history.

(56) References Cited

U.S. PATENT DOCUMENTS 10,587,406 B1 * 3/2020 Levin .................... H04L 9/0869
10,642,994 B1 * 5/2020 Allen .................. H04L 63/0428
11,188,376 B1 * 11/2021 Alexander .......... G06F 9/45558
11,328,082 B2 * 5/2022 Salomon ................. H04L 9/008
11,646,869 B1 * 5/2023 Tamosiunas .......... H04L 9/0819 713/171
11,676,103 B2 * 6/2023 Jones .................... G06F 16/258 713/160
11,755,768 B2 * 9/2023 Binkley ................ G06F 21/604 726/1
11,887,583 B1 * 1/2024 Strimel ................... G10L 15/16
11,899,810 B2 * 2/2024 Piecko .................... G06F 16/21
11,915,104 B2 * 2/2024 Range ..................... G06F 16/35
11,956,245 B1 * 4/2024 Bhatt ........................ G06N 5/04
2007/0244738 A1 * 10/2007 Chowdhary ......... G06Q 10/063 705/7.31
2008/0097937 A1 * 4/2008 Hadjarian .............. G06N 20/00 706/12
2009/0171662 A1 * 7/2009 Huang ................ G10L 15/1822 704/E15.041
2015/0379429 A1 * 12/2015 Lee .......................... G09B 5/00 706/11
2017/0359175 A1 * 12/2017 Tamura ................. H04L 9/0894
2018/0167381 A1 * 6/2018 Roth ...................... H04L 9/0891
2019/0140911 A1 * 5/2019 Jain ........................ G06N 20/00
2019/0311137 A1 * 10/2019 Mallya ................... G06N 20/00
2020/0065710 A1 * 2/2020 Range ................. G06F 16/9024
2021/0397546 A1 * 12/2021 Cser ........................ G06V 10/82
2022/0129551 A1 * 4/2022 Collier .................. G06F 21/565
2022/0391530 A1 * 12/2022 Anneboina ....... G06F 16/24578
(Continued)

FOREIGN PATENT DOCUMENTS

WO WO-2007107658 A1 * 9/2007 ............ G06F 21/62

*Primary Examiner* — Tauqir Hussain
(74) *Attorney, Agent, or Firm* — Davis Wright Tremaine LLP

(57) ABSTRACT

Methods, systems, and techniques to generate at least one data-class footprint based at least in part on classification of metadata related to one or more computing objective into one or more data classes.

20 Claims, 13 Drawing Sheets

(56) References Cited

U.S. PATENT DOCUMENTS

| | | | | |
|---|---|---|---|---|
| 2024/0394422 | A1* | 11/2024 | Kumar | G06F 30/27 |
| 2025/0094634 | A1* | 3/2025 | Jones | G06F 21/6254 |
| 2025/0095366 | A1* | 3/2025 | Nelson | G06V 20/46 |
| 2025/0104096 | A1* | 3/2025 | Vidal | A61D 99/00 |
| 2025/0209225 | A1* | 6/2025 | Kumar | G06F 30/13 |
| 2025/0217905 | A1* | 7/2025 | Kumar | G06Q 10/103 |
| 2025/0259180 | A1* | 8/2025 | Zhang | G06Q 30/0609 |
| 2025/0278510 | A1* | 9/2025 | Schmehl | H04L 9/0643 |
| 2025/0321985 | A1* | 10/2025 | Ivaturi | G06F 16/288 |
| 2025/0384156 | A1* | 12/2025 | Muniraju | G06F 16/128 |
| 2026/0037579 | A1* | 2/2026 | Ghosh | G06F 16/9035 |
| 2026/0149722 | A1* | 5/2026 | Kasiolas | G06F 21/6218 |

* cited by examiner

GENERATING SEMI-DATA-BLIND DATA-CLASS FOOT-PRINTS TO IMPROVE SYSTEM SECURITY

BACKGROUND

Data foot-printing is a process of collecting information about target data communicated between software and/or hardware components of a computing system. For example, data foot-printing can create one or more records related to the data throughout its lifecycle. Information gathered by data foot-printing can be used to improve security with respect to the target data.

BRIEF DESCRIPTION OF THE DRAWINGS

Various techniques will be described with reference to the drawings, in which.

DETAILED DESCRIPTION

Figure 1:
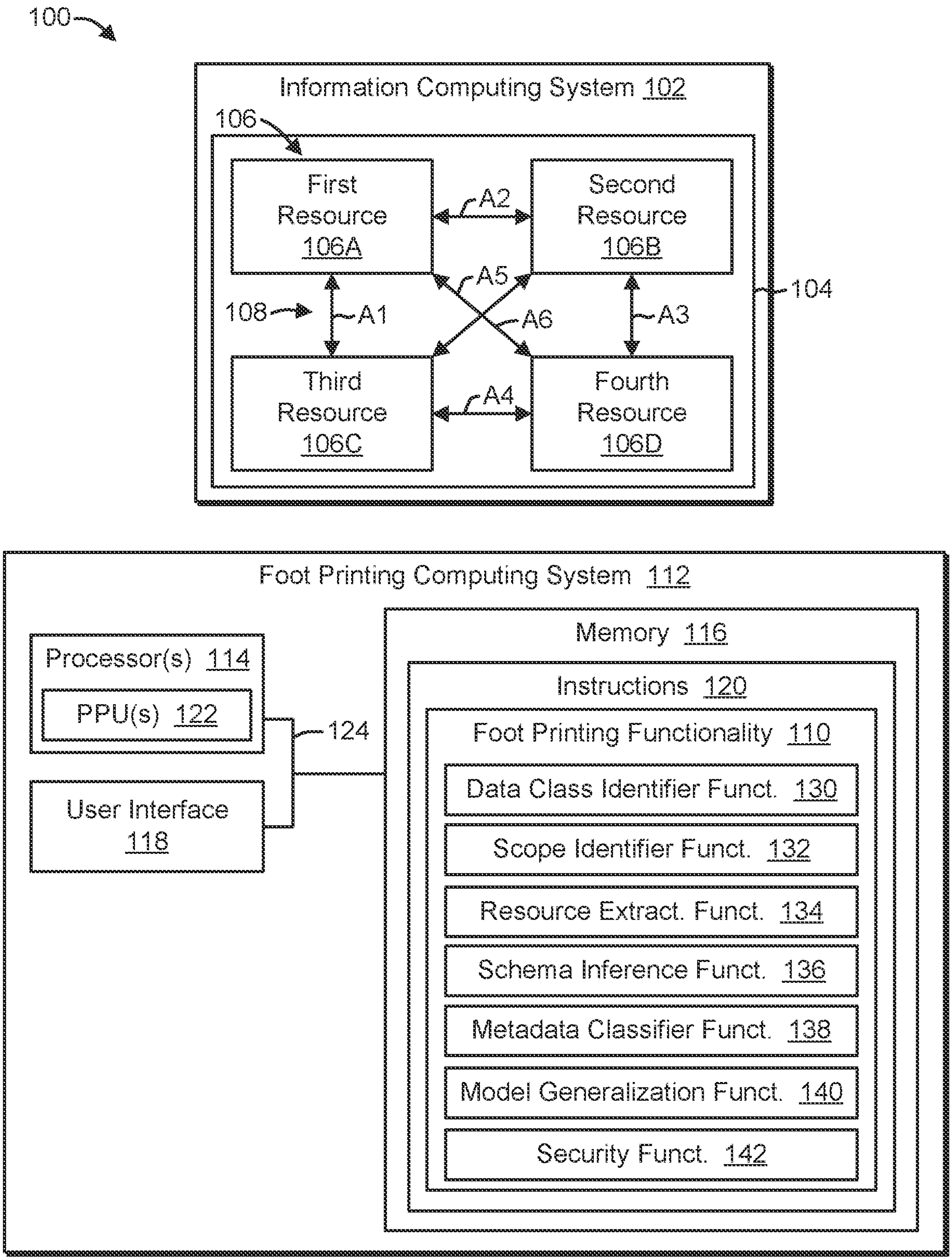
FIG. 1 illustrates a block diagram illustrating an example system, in accordance with at least one embodiment.

Computer code (e.g., source code and/or object code) defines data (e.g., data objects, classes, data structures, variables, parameters, data items, etc.) to be used by and/or passed between computing resources (e.g., application(s), service(s), database(s), function(s), Application Programming Interface(s), etc.). For example, a data definition provided by the computer code specifies a data format and a data identifier (e.g., name) for each piece of data to be used and/or passed by the computer code. When the computer code is executed (e.g., by one or more processors), the data definition of particular data (e.g., a data class) can be used to create an instance of the particular data that can store at least one data value in accordance with the data format. While the definition is specified by the computer code, the instance of the particular data exists at runtime.

Metadata is data about other data. Information provided by the definition of particular data (e.g., its data formats and data identifier) will be referred to as being metadata. The computer code need not be executed to obtain the metadata. Metadata can be obtained from the computer code, and/or information about the computer code. Information about data (e.g., data format, field type, data schema, etc.) that is to be stored or is actually stored and persists (e.g., in a database) will be referred to as being metadata. As described herein, such metadata may be inferred from information about one or more databases and/sample data. However, metadata excludes data values of data instantiated at runtime and data values of stored data.

One or more centralized systems can implement one or more data foot-printing tools that use actual system data generated at runtime and/or actually stored by an information computing system to generate data footprint(s). Unfortunately, using such centralized data foot-printing tool(s) to perform data foot-printing can be disruptive, costly, and/or create security concerns with respect to the data being foot printed. In some circumstances, a data foot-printing tools themselves can potentially become a target of an attack or a potential attack surface.

However, in many practical scenarios, data values are not of primary concern. Instead, significant information can be obtained by classifying metadata (e.g., data formats and data identifiers) associated with the data into data classes and analyzing the flow of these data classes through the information computing system to generate one or more data-class footprints. For example, metadata describing one or more data objects but not including any data value(s) can be classified according to a set of data classes and the classification(s) can be used to generate a data-class footprint. Because sufficient information is included in the metadata associated with particular data (e.g., data formats and/or data identifiers), insights can be gained from such data-class footprint(s) and used to improve security of the information computing system. Further, data-class footprints can achieve the same or similar analytical objective as data footprints generated for one or more instance of the particular data but without accessing the actual system data itself.

A data-class footprint tracks data classes (e.g., customer data, non-customer data) as the data classes are passed between, stored by, and/or processed by components of the information computing system, instead of tracking actual system data through the information computing system. Operations performed with respect to the data classes can be abstracted or generalized to simplify a data-class footprint.

Instead of using actual system data, data-class footprints are generated using information about how the information computing system performs one or more computing objectives. Data-class footprints can be generated by inferring information from metadata obtained by analyzing computing resources of the information computing system that perform the computing objective(s). The metadata can include data schemas extracted from structured data and/or semi-structured data, and/or inferred from information related to data in transit. For example, a foot-printing computing system can infer data schemas for data in transit from service contracts, media type, type of data, and/or other information associated with the computing resources performing the computing objective(s). To increase accuracy of the inference (or classification), other types of contextual information can be used, such as how the computing resources are connected, which computing resources are communicating with one another, and/or other types of contextual information.

Data-class foot-printing can be performed in a data-blind manner, which means a foot-printing computing system performing data-class foot-printing does not access actual system data itself and therefore, does not have access to the data values. Instead, the system uses metadata (e.g., data schemas, data formats, data identifiers, etc.) to generate a data-class footprint. In some cases, the foot-printing computing system performs data-class foot-printing in a semi-data-blind manner in which the system accesses sample data (e.g., unstructured data) and infers metadata (e.g., data schemas) using that sample data. The sample data might not include any actual system data and/or data values, and/or might not be conceptually correct. Systems performing data-blind and/or semi-data-blind data-class foot-printing can avoid disruption, cost, and/or security concerns associated with data foot-printing techniques.

The foot-printing computing system can perform the data-class foot-printing using a method that can be divided into five stages. During a first stage, the foot-printing computing system identifies data classes of interest, one or more computing objectives of the information computing system (e.g., performing a particular type of transaction), and one or more components (e.g., application union(s)) of the information computing system involved in performing the computing objective(s). In the second stage, the foot-printing computing system identifies computing resources (e.g., application(s), service(s), database(s), data lake(s), and/or the like) associated with the component(s) identified in the first stage. In the third stage, the foot-printing computing system identifies metadata associated with the computing resources identified in the second stage. In the fourth stage, the foot-printing computing system classifies the metadata into the data classes identified in the first stage. In the fifth stage, the foot-printing computing system generates one or more data-class footprints based at least in part on the classified metadata. The foot-printing computing system can use the data-class footprint(s) to improve security of the information computing system.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

FIG. 1 illustrates a block diagram illustrating an example system 100, in accordance with at least one embodiment. The system 100 can be used to generate one or more data-class footprints. The system 100 includes an information computing system 102 (e.g., one or more computing devices, a data center, a cloud computing system, and/or the like). The information computing system 102 includes one or more components 104 to process actual system data 108. The component(s) 104 can each include hardware and/or software. The component(s) 104 can include and/or access one or more resources 106 (e.g., one or more applications, one or more services, one or more micro-services, and/or the like) and/or one or more storage resources (e.g., one or more databases). The component(s) 104 can perform one or more computing objectives (e.g., perform one or more types of transactions). Portions of the actual system data 108 can flow (e.g., illustrated by arrows A1-A6) between two or more of the resource(s) 106 as the information computing system 102 performs the computing objective(s). The component(s) 104 may be implemented as one or more Application Unions that include those of the resource(s) 106 that perform a particular one of the computing objective(s). The Application Union(s) can exclude those of the resource(s) 106 that are not involved in performing the particular computing objective. For example, an Application Union can be created for performing a particular type of computing transaction. While the resource(s) 106 have been illustrated as including resources 106A-106D, the resource(s) 106 can include any number of resources (e.g., one or more compute resources and/or one or more storage resources).

As mentioned above, when the information computing system 102 actually performs the computing objective(s), the actual system data 108 flows (e.g., illustrated by the arrows A1-A6) between two or more of the resource(s) 106. The system 100 includes foot-printing functionality 110 that can be implemented by the information computing system 102 and/or a foot-printing computing system 112. The foot-printing functionality 110 can be used to generate data-class footprints, for example, in a data-blind or semi-data blind manner, in which the foot-printing functionality 110 does not have access to the actual system data 108. In other words, the foot-printing functionality 110 can be blind with respect to the actual system data 108. Instead, the foot-printing functionality 110 generates data-class footprints using metadata, which includes information related to the computing objective(s), such as those of the resource(s) 106 involved in performing the computing objective(s), and metadata related to the data transmitted and/or received by those resource(s) 106 when performing the computing objective(s). Because such information is based on system design, this information can be obtained without accessing the actual system data 108.

The foot-printing computing system 112 can include one or more processors 114, memory 116, and a user interface 118. The memory 116 (e.g., one or more non-transitory processor-readable medium) stores machine executable instructions 120 that when performed by processor(s) 114 implement the foot-printing functionality 110. The processor(s) 114 can include one or more circuits that perform at least a portion of the instructions 120 stored in the memory 116. The processor(s) 114 can include one or more parallel processing units ("PPU(s)") 122, such as one or more graphics processing units ("GPU(s)"), one or more accelerators, and/or others. The processor(s) 114 can be implemented, for example, using a main central processing unit ("CPU") complex, one or more microprocessors, one or more microcontrollers, PPU(s) (e.g., accelerator(s), GPU(s), and/or others), one or more data processing units ("DPU(s)"), one or more arithmetic logic units ("ALU(s)"), and/or others. The memory 116 (e.g., one or more non-transitory processor-readable medium) can be implemented, for example, using volatile memory (e.g., dynamic random-access memory ("DRAM")) and/or nonvolatile memory (e.g., a hard drive, a solid-state device ("SSD"), and/or others). The user interface 118 can include a display device (not shown) that a user can use to view information generated and/or displayed by the foot-printing computing system 112 of which the display device is a part. In at least one embodiment, the user can use the user interface 118 to enter user input into the foot-printing computing system 112 of which the user interface 118 is a part. In at least one embodiment, referring to FIG. 1, the user interface 118 can communicate (e.g., wirelessly) with a user device (e.g., a cellular telephone, a laptop computer, a tablet, and/or others) and can receive user input from the user device. In at least one embodiment, the processor(s) 114, the memory 116, and/or the user interface 118 can communicate with one another over connection(s) 124, such as a bus, a Peripheral Component Interconnect Express ("PCIe") connection (or bus), and/or others.

While the information computing system 102 and the foot-printing computing system 112 have been illustrated and described as belong to the system 100, in at least one embodiment, the information computing system 102 and the foot-printing computing system 112 need not communicate with one another. Thus, the information computing system 102 and the foot-printing computing system 112 need not be components of a common system and/or connected to one another, for example, by a network. However, in at least one embodiment, the information computing system 102 and the foot-printing computing system 112 can be connected to one another, for example, by a network (not shown).

The foot-printing functionality 110 when performed by the processor(s) 114 can cause the foot-printing computing system 112 to perform a method of generating data-class footprints that can be characterized as including five stages. The foot-printing functionality 110 includes data class identifier functionality 130 and scope identifier functionality 132 to perform a first stage of the method. The data class identifier functionality 130 identifies data classes of interest, and the scope identifier functionality 132 obtains one or more computing objectives (e.g., performing a particular type of transaction) of the information computing system 102 and/or identification(s) of one or more of component(s) 104 involved in performing the computing objective(s). The component(s) 104 identified by the identification(s) can include one or more Application Unions.

The foot-printing functionality 110 includes resource extraction functionality 134 to perform a second stage of the method. The resource extraction functionality 134 identifies those of the resource(s) 106 associated with any of the component(s) 104 identified in the first stage. The foot-printing functionality 110 includes schema inference functionality 136 to perform a third stage of the method. The schema inference functionality 136 identifies metadata (e.g., one or more schemas) associated with those of the resource(s) 106 identified in the second stage. A data schema can specify how data (e.g., data items) is organized, stored, and/or accessed within a database or other type of data store (e.g., a data lake). The foot-printing functionality 110 includes metadata classifier functionality 138 to perform a fourth stage of the method. The metadata classifier functionality 138 classifies the metadata into the data classes identified in the first stage. The foot-printing functionality 110 includes model generalization functionality 140 to perform a fifth stage of the method. The model generalization functionality 140 generates one or more data-class footprints based at least in part on the classified metadata.

The foot-printing functionality 110 can include security functionality 142 that can determine one or more actions to improve security of the information computing system 102 based at least in part on the data-class footprint(s). Non-limiting examples of such actions include increasing security monitoring of one or more of the resource(s) 106, increasing security with respect to (e.g., limiting access to) one or more of the resource(s) 106, modify one or more of the resource(s) 106 to use different (e.g., less secure) data, relocating one or more of the resource(s) 106 to more secure computing hardware, relocating a portion of the data to storage in one or more different databases, etc. In at least one embodiment, the security functionality 142 causes the information computing system 102 to implement the action(s) to improve security. The foot-printing functionality 110 can provide the data-class footprint(s) to another process and/or system for analysis thereby.

Figure 2:
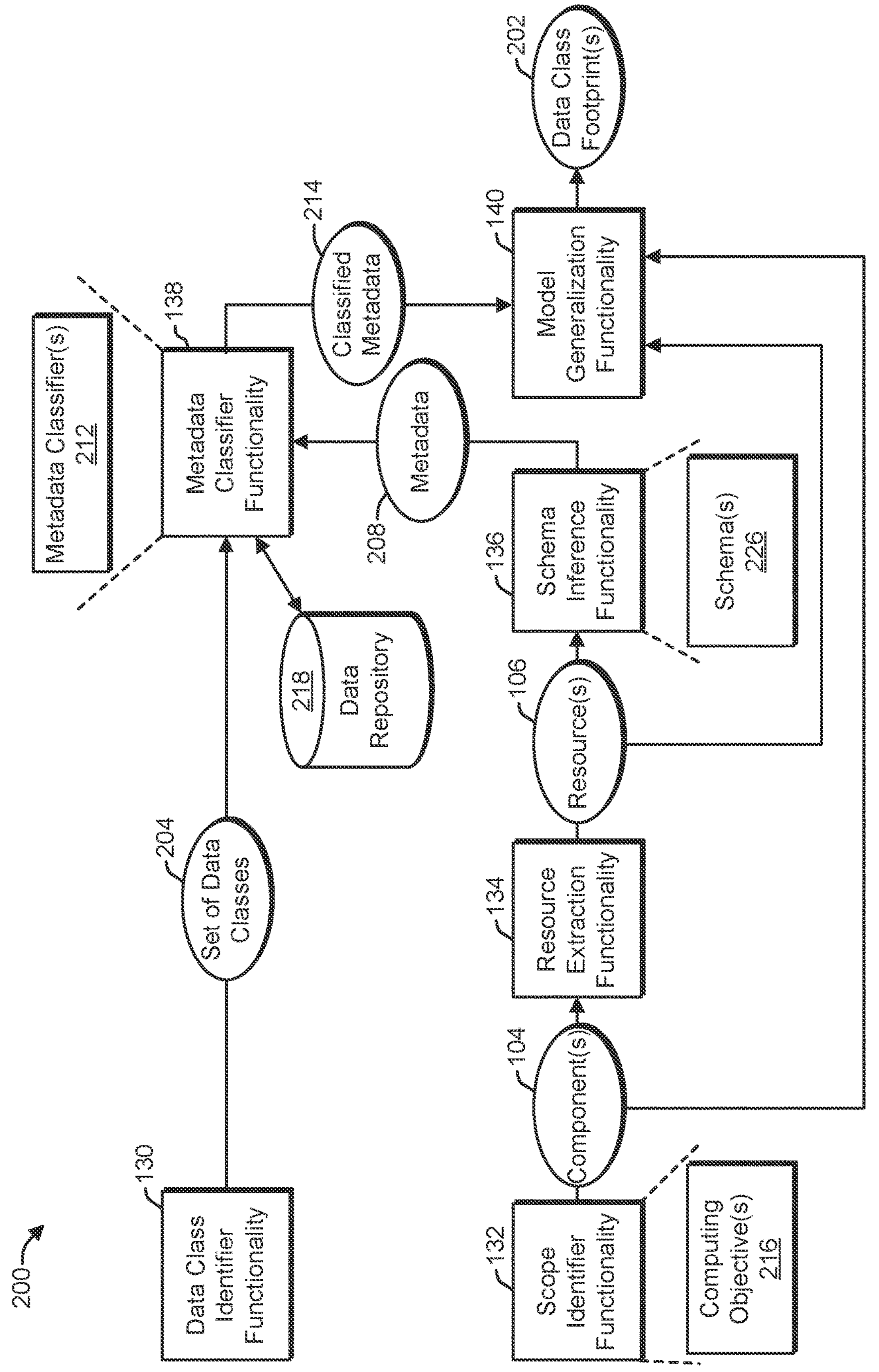
FIG. 2 illustrates a block diagram depicting an example data flow to generate one or more data-class footprints, in accordance with at least one embodiment.

FIG. 2 illustrates a block diagram depicting an example data flow 200 to generate one or more data-class footprints 202, in accordance with at least one embodiment. In at least one embodiment, the data flow 200 is implemented by the foot-printing functionality 110 (see FIG. 1) and generates the data-class footprint(s) 202 in a data-blind or semi data-blind manner in which the foot-printing functionality 110 does not have access to the actual system data 108. In at least one embodiment, the data flow 200 is implemented by the foot-printing functionality 110 when the foot-printing functionality 110 is performed by the processor(s) 114 (see FIG. 1).

The data class identifier functionality 130 obtains a set 204 of data classes to be used by the metadata classifier functionality 138 to classify metadata 208. The data class identifier functionality 130 can obtain the set 204 of data classes from a file or database table. The set 204 of data classes can be specified and/or selected by one or more users, and/or one or more automated processes (e.g., one or more machine learning processes, such as one or more neural networks). Granularity of the data classes in the set 204 can be adjusted, as appropriate, by one or more users and/or one or more automated processes. Non-limiting examples of data classes in the set 204 include public, confidential, highly confidential, and so on. However, different classification schemes can be used. For example, the set 204 of data classes can include a set of data categories (e.g., product data, customer data, and control data) and a set of confidentially levels (e.g., public, confidential, and highly confidential data). The set 204 of data classes can provide some subjective meaning to data and define their significance with respect to one or more computing objectives, at least a portion of the information computing system 102, and/or one or more particular investigations involving the data-class footprint(s) 202. For example, the set 204 of data classes can include a first class (e.g., a PII class) for personally identifiable information, and a second class (e.g., a non-PII class) for information that is not personally identifiable information. Such data classes can be used to investigate how PII data enters and traverses the information computing system 102. The set 204 of data classes can include any number of data classes based at least in part on one or more objectives of the data-class foot-printing being performed. The data class identifier functionality 130 provides the set 204 of data classes to the metadata classifier functionality 138 and/or the model generalization functionality 140.

As mentioned herein, at least a portion of the foot-printing functionality 110 (see FIG. 110) uses the metadata 208 instead of the actual system data 108 (see FIG. 1) to generate the data-class footprint(s) 202. The metadata classifier functionality 138 can create one or more metadata classifiers 212 to classify the metadata 208 into the set 204 of data classes and/or the metadata classifier(s) 212 can be pre-existing. The metadata classifier functionality 138 can use a combination of artificial intelligence (AI) and machine learning (ML)

approaches to create the metadata classifier(s) 212 based at least in part on the pre-defined set 204 of data classes. The ML component can be trained using tagged or labeled metadata and the AI can use different context sensitive and rule based mechanism (such a Fuzzy Inference Systems). The metadata classifier functionality 138 uses the metadata classifier(s) 212 to classify the metadata 208 to obtain classified metadata 214. In at least one embodiment, the metadata classifier(s) 212 is/are implemented using one or more machine learning processes, such as one or more Bidirectional Encoder Representations from Transformers models, one or more neural networks, one or more transformers, and/or the like.

The scope identifier functionality 132 obtains one or more computing objectives 216 and one or more identifiers of portions of the information computing system 102 (e.g., identifiers of the component(s) 104) involved in achieving the computing objective(s) 216. For example, a user and/or an automated process can select the computing objective(s) 216, and/or identify the component(s) 104 involved in performing the selected computing objective(s) 216. In at least one embodiment, the component(s) 104 include one or more Application Union(s). For example, the computing objective(s) 216 can be performing "BuyNow" functionality, and the component(s) 104 can be an Application Union that implements the "BuyNow" functionality. The Application Union(s) obtained can help determine an abstraction level for the data-class foot-printing being performed. The Application Union(s) can be characterized as including those of the resource(s) 106 that interact to achieve the computing objective(s) 216. The Application Union(s) can each have a clear boundary with the environment in which the Application Union resides and can interact with the environment through well-defined communication interfaces. The Application Union(s) can be selected so that a number of the resource(s) 106 at the same abstraction level included in each of the Application Union(s) is not overly large (e.g., greater than six) because a large number of resource(s) 106 can make modelling difficult.

Figure 3:
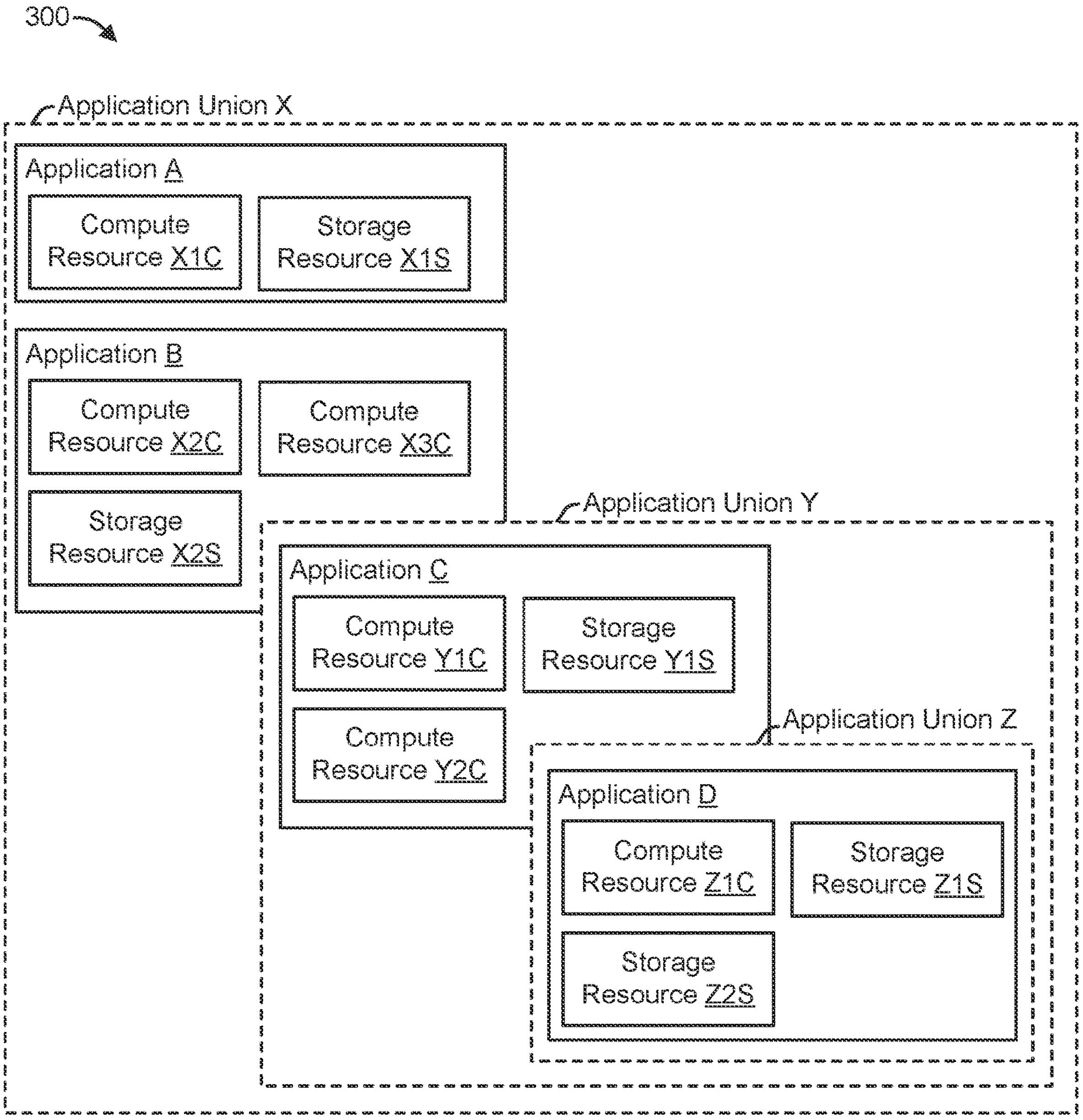
FIG. 3 illustrates a block diagram illustrating example Application Unions involved in performing a computing objective, in accordance with at least one embodiment.

FIG. 3 illustrates a block diagram illustrating example Application Unions 300 involved in performing a computing objective, in accordance with at least one embodiment. Referring to FIG. 3, the Application Unions 300 include Application Unions X, Y, and Z. FIG. 3 depicts four Applications A-D. The Application Union Z includes Application D, which includes compute resource Z1C and storage resources Z1S and Z2S. The Application Union Y includes the Application Union Z and Application C, which includes storage resource Y1S and compute resources Y1C and Y2C. The Application Union X includes the Application Union Y and Applications A and B. The Application A includes storage resource X1S and compute resource X1C, and the Application B includes storage resource X2S and compute resources X2C and X3C. For example, referring to FIG. 2, if the computing objective(s) 216 include the computing objective of FIG. 3, the component(s) 104 will include the Application Unions X, Y, and Z. In at least one embodiment, the Application Union X corresponds to the component(s) 104 of FIG. 1, and the resources X1S, X1C, X2S, X2C, X3C, Y1S, Y1C, Y2C, Z1C, Z1S and Z2S correspond to the resource(s) 106 of FIG. 1.

Referring to FIG. 2, the component(s) 104 can be identified manually and/or automatically (e.g., by using one or more machine learning processes or models to automatically extract or identify the component(s) 104 that implement, enable, and/or interact with the computing objective(s) 216). For example, the component(s) 104 can be identified semi-automatically by using a process (e.g., ML model(s)) to identify candidate components), and one or more users can select one or more components to be analyzed from the candidate components. The component(s) 104 can each include one or more applications, one or more services, one or more micro-services, one or more monolith components, etc. that interact to achieve the computing objective(s) 216. The scope identifier functionality 132 can output the component(s) 104 to the resource extraction functionality 134 and the model generalization functionality 140.

The resource extraction functionality 134 identifies the resource(s) 106 of the component(s) 104. Each of the component(s) 104 includes and/or accesses one or more of the resource(s) 106. For example, the component(s) 104 can each include and/or access one or more compute resources (e.g., the compute resources X1C, X2C, X3C, Y1C, Y2C, and Z1C illustrated in FIG. 3) and/or one or more storage resources (e.g., the storage resources X1S, X2S, Y1S, Z1S and Z2S illustrated in FIG. 3). Thus, the resource(s) 106 can include one or more compute-type resources and/or one or more storage-type resources. For example, if the computing objective(s) 216 include the computing objective of FIG. 3 involving the Application Unions 300, the resource(s) 106 will include the storage resources X1S, X2S, Y1S, Z1S and Z2S, and the compute resources X1C, X2C, X3C, Y1C, Y2C, and Z1C. The resource extraction functionality 134 can automatically extract the resource(s) 106 using the component(s) 104. The resource extraction functionality 134 can obtain identifications of the resource(s) 106 at least in part from one or more files and/or one or more database tables. A manual, automated, and/or semi-automated process can be used to identify the resource(s) 106 (e.g., depending on the environment to which they have been deployed). For example, the resource extraction functionality 134 can fully automatically extract those of the resource(s) 106 belonging to a particular one of the component(s) 104 if the resources are tagged or labeled correctly based on the computing objective they help realize. The resource extraction functionality 134 provides the resource(s) 106 to the schema inference functionality 136 and the model generalization functionality 140.

The schema inference functionality 136 can obtain one or more schemas 226 (e.g., database schema(s)) using the resource(s) 106. The schema inference functionality 136 can use machine learning (e.g., one or more neural networks) to obtain one or more of the schema(s) 226 and/or non-ML approaches to obtain one or more of the schema(s) 226. The metadata 208 includes the schema(s) 226 (e.g., in a canonical format) obtained by the schema inference functionality 136. Thus, the schema inference functionality 136 generates at least a portion of the metadata 208. The metadata 208 can include any types of metadata associated with the resource(s) 106 and/or that can be inferred from the resource(s) 106. For example, the metadata 208 may include field names, field description, field types, table names, and/or table descriptions.

The schema inference functionality 136 can obtain different types and/or forms of metadata (e.g., from one or more files, one or more databases, and/or the like) for data at rest and data in transit. The schema inference functionality 136 can use the obtained metadata to obtain the schema(s) 226. For example, data can be transferred between two or more of the resource(s) 106 using function calls and/or Application Programming Interface (API) calls. The definitions of such calls can include parameters that identify data types and/or variable names. The schema inference functionality 136 can use this information to infer a schema with respect to data being transferred to and/or from a storage location (e.g., a database). Data in transit can enter and/or leave the resource(s) 106 (e.g., grouped into an Application Union) via exposed interfaces (e.g., APIs) of one or more edge components internal to the Application Union. This data can be received by such exposed interfaces from external technical components, exposed interfaces of external technical components, other internal edge components, and/or a user interface operated by external social components (e.g., human users). Internally (inside an Application Union) between technical components, data is also communicated via these interfaces. These interfaces can be the source of metadata for schema inference performed by the schema inference functionality 136 for data in transit (without having access to the actual system data 108). Additionally or alternatively, for data in transit, the metadata for schema inference performed by the schema inference functionality 136 can include service contracts, media types (e.g., customized media types), message formats, and/or resource types.

For data at rest, the schema(s) 226 can include predefined data schemas and/or inferred data schemas. Data at rest can be stored in one or more data stores that can provide at least a portion of the schema(s) 226 (depending on the storage model). Data can be structured, semi-structured or unstructured. In at least one embodiment, the schema inference functionality 136 avoids inferring structured data because metadata associated with the structured data will include the data schema and any associated ones of the resource(s) 106. For semi-structured data, the schema inference functionality 136 can infer the schema from sample data. The sample data can have a self-describing structure that can be used for the inference but does not include any of the actual system data 108 and/or is not conceptually correct.

Unstructured data can include data stored in a data store (e.g., a data lake) in accordance with multiple different data schemas (e.g., new unstructured data added to the data store can have a new data schema). However, the schema inference functionality 136 can analyze a sufficiently large amount of data with respect to the data store to increase a probability that all data schemas present in the data store have been inferred by the schema inference functionality 136. The amount of data can be determined at least in part by the desired probability and unstructured-ness of the data. In at least one embodiment, the schema inference functionality 136 can access at least a portion of the actual system data 108 stored as unstructured data to infer one or more schema(s). Thus, in at least one embodiment, the foot-printing functionality 110 is semi-blind with respect to the actual system data 108. In embodiments in which the resource(s) 106 do not store and/or access unstructured data, the foot-printing functionality 110 is data-blind. The schema inference functionality 136 can transform the schema(s) 226 (e.g., using an encoder, a machine learning encoder, and/or the like) into a canonical format (e.g., a vector format). The output of the schema inference functionality 136 includes at least a portion of the metadata 208, which includes the schema(s) 226 (e.g., in the canonical format) associated with the resource(s) 106.

As mentioned above, the metadata classifier functionality 138 obtains (e.g., creates) the metadata classifier(s) 212 and obtains the classified metadata 214 by using the metadata classifier(s) 212 to classify the metadata 208. The schema inference functionality 136 and/or the metadata classifier functionality 138 can perform a pre-processing operation on the schema(s) 226 before the schema(s) 226 is/are included in the metadata 208 and/or classified by the metadata classifier functionality 138. The pre-processing operation can standardize at least a portion of a schema (e.g., one or more field names), reduce noise (e.g., remove non-alphabetic characters, spaces, etc.), and/or reduce (e.g., minimize) dimensionality. For example, the pre-processing operation can transform a field name "customer_id_123" into a standardized form, such as "customerid." The pre-processing operation can be used to standardize other forms of metadata, such as data identifiers (e.g., names) and/or data formats. Output of the pre-processing operation may be stored in a data repository 218.

The metadata classifier functionality 138 can use a combination of rule-based and ML approaches to classify the metadata 208 (e.g., including the schema(s) 226 in the canonical format) into the data classes of the set 204. The metadata classifier functionality 138 may have access to the data repository 218 that stores classification information (e.g., training data for the metadata classifier(s) 212). The classification information can include information relevant to and associated with specific data identified using a name (e.g., processed by the pre-processing operation to be in the standardized form), such as tags (e.g., PII, and non-PII), alias, descriptions (e.g., names), example values stored in the data. For example, the data repository 218 may associate the data identifier "customerid" with a PII tag.

A schema included in the metadata 208 can include, for example, information such as Field names (e.g., "customer_name"). Field descriptions (e.g., "customer first and last names"), Field types (e.g., "string"), Table name (e.g., "customer_shipment"), and/or Table description (e.g., "NA"). A user can provide information (e.g., in a service contract) with respect to data flowing between and/or being stored by the resource(s) 106. This information can be stored in the data repository 218. Such information can include indications of a security level associated with the data. The metadata classifier functionality 138 can use the information stored in the data repository 218, for example, to determine to which of the data classes the data stored in the data repository belongs. For example, the metadata classifier functionality 138 can determine that data including a field name "CustomerID" belongs to the PII class.

Figure 7:
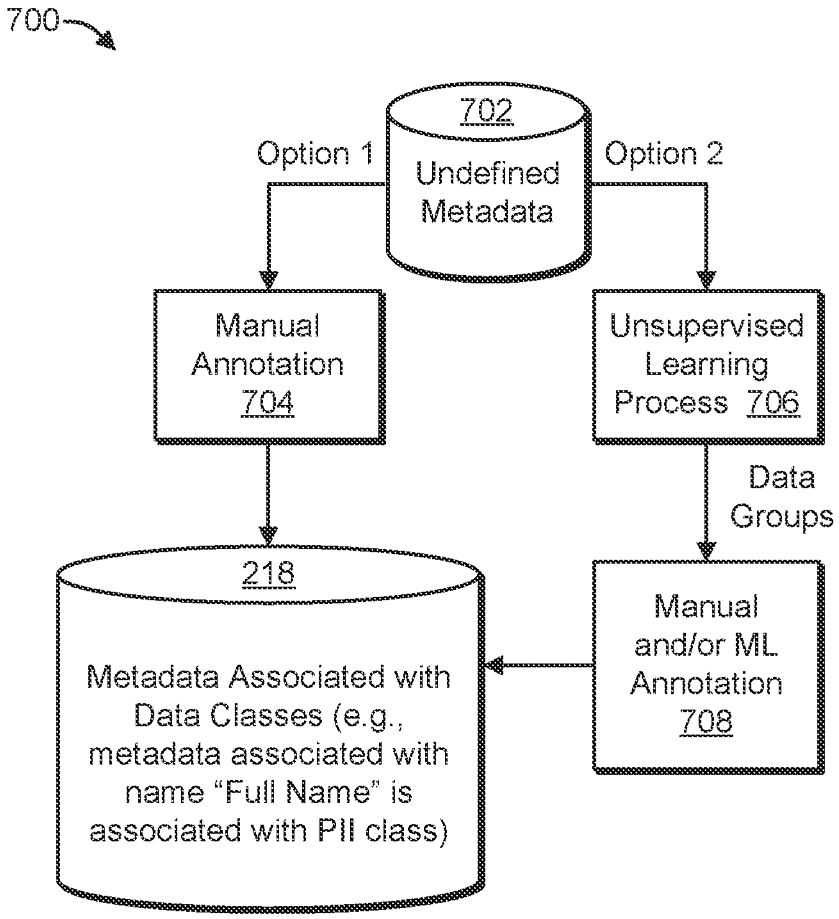
FIG. 7 illustrates a block diagram depicting methods of generating data to be used to classify metadata, in accordance with at least one embodiment.

FIG. 7 illustrates a block diagram depicting methods 700 of generating data to be used to classify metadata, in accordance with at least one embodiment. Referring to FIG. 7, undefined metadata 702 can follow option 1 or option 2. Any undefined metadata processed using option 1 is annotated manually 704 with a data class and stored with the associated data class in the data repository 218. Any undefined metadata processed using option 2 can be grouped 706 into groups by an unsupervised machine learning process. The unsupervised machine learning process groups similar data items into a common group. Then, the group(s) created at 706 are annotated 708 with a data class manually and/or using at least one machine learning model, and the metadata in the groups is stored with the associated data class in the data repository 218. The machine learning model(s) used to group the metadata can implement topic modeling, which can expand fuzzy matching. Topic models are statistical models used to identify and extract abstract "topics" or groups that occur in the undefined metadata 702. Latent Dirichlet Allocation (LDA) can be used to model names in the undefined metadata 702. For example, LDA may identify a set of clusters or groups (e.g., 300 clusters) of similar metadata to assist manual annotation of the undefined metadata 702. For example, the machine learning model(s) may group names "customer id," "person id," and "user name"

into a group because these names are similar. Then, a user can annotate the group with a data class (e.g., "Personal Data").

The rule-based portion of the metadata classifier functionality 138 can use string matching to identify data elements (e.g., in the metadata 208) belonging to the same data classes as data stored in the data repository 218. String matching can include exact matching, fuzzy matching, and/or using one or more machine learning processes to identify matching strings. Exact matching will determine the first metadata (e.g., after the first metadata is processed by the pre-processing operation) is an exact match with the second metadata (e.g., after the second metadata is processed by the pre-processing operation) if a name (e.g., a field name) associated with the first metadata is identical to a name associated with the second metadata. For example, if the field name "CustomerID" is identified as belonging to the PII class, exact matching may be used to classify any schema containing the field name "CustomerID" in the PII class. More complex rules can be used by the rule-based portion of the metadata classifier functionality 138 that incorporate multiple elements or other metadata.

Fuzzy matching will determine the first metadata (e.g., after the first metadata is processed by the pre-processing operation) is a match with the second metadata (e.g., after the second metadata is processed by the pre-processing operation) if a name (e.g., a field name) associated with the first metadata is sufficiently similar to a name associated with the second metadata. For example, two fields can be considered a match if a similarity score calculated using their respective names exceeds a threshold value (e.g., >0.5). The threshold value may be determined empirically, and different threshold values may be used depending upon the circumstances (e.g., length of strings for which the similarity score is calculated). The similarity score may be calculated, for example, between a first name (s1) and a second name (s2) by subtracting an edit distance between s1 and s2 divided by a maximum length of s1 and s2 from one (e.g., Similarity Score=1−((edit distance between s1 and s2)/(maximum of length(s1) and length(s2)))). As mentioned above, the first name (s1) and a second name (s2) may be standardized by the pre-preprocessing operation before the similarity score is calculated. Which characters are removed by the pre-preprocessing operation and/or the threshold value can be determined by analysis of real data. A field (e.g., first metadata) can be determined to belong to a particular data class (e.g., the PII class) if the field corresponds to (e.g., using exact or fuzzy matching) a field or other data element (e.g., second metadata) that is associated with the particular data class in the data repository (not shown). Third metadata including or associated with the first metadata may be classified in the same particular data class as the first metadata, for example, if the particular data class indicates the first metadata belongs to a higher security level (e.g., the PII class).

Machine learning process(es) may be used to determine whether the first metadata (e.g., after the first metadata is processed by the pre-processing operation) is a match with the second metadata (e.g., after the second metadata is processed by the pre-processing operation). For example, one or more Large Language Models (LLM(s)), one or more Bidirectional Encoder Representations from Transformers (BERT) models, one or more neural networks, one or more transformers, and/or the like can be used to determine whether a name (e.g., a field name) associated with the first metadata is sufficiently similar to a name associated with the second metadata.

Figure 8:
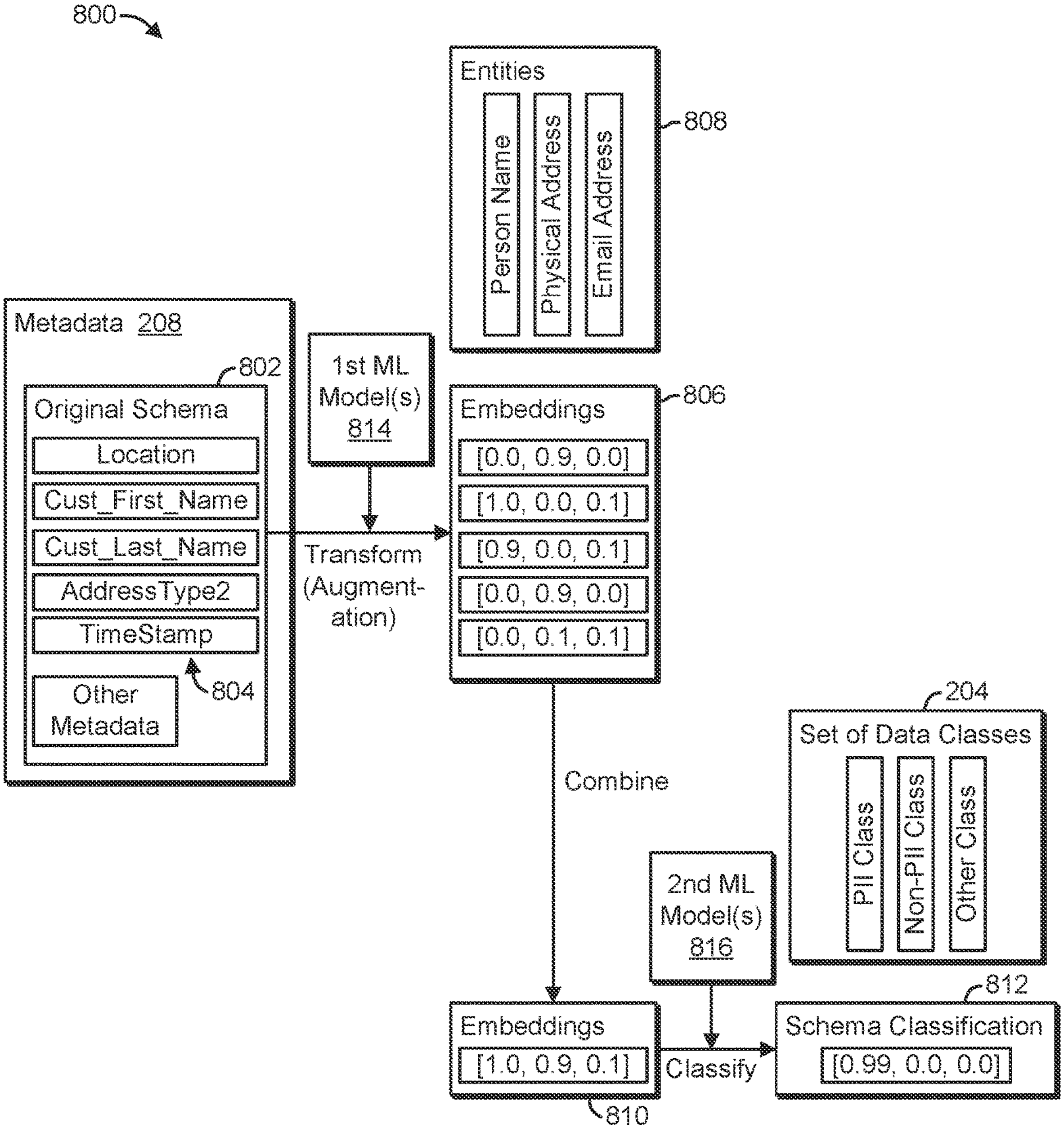
FIG. 8 illustrates a block diagram illustrating an example process of classifying metadata, in accordance with at least one embodiment.

The ML portion of the metadata classifier functionality 138 can include one or more of the metadata classifier(s) 212 (e.g., one or more neural networks) to classify the metadata 208 into one or more of the data classes of the set 204. For example, the metadata classifier(s) 212 can be trained utilizing labeled training data to discern patterns in less common data schemas. FIG. 8 illustrates a block diagram illustrating an example process 800 of classifying metadata, in accordance with at least one embodiment. In at least one embodiment, the process 800 is performed at least in part by the ML portion of the metadata classifier functionality 138. The metadata 208 may include one or more data schemas (e.g., a schema 802) that each includes one or more fields (e.g., fields 804) and can include other metadata. Referring to FIG. 8, the ML portion may transform the fields in each of the schema(s) included in the metadata 208 into embeddings (e.g., embeddings 806) that indicate likelihoods that the fields each belongs to each entity in a set of entities (e.g., set 808 of entities) (or each category in a set of categories). For example, in the example illustrated in FIG. 8, a field named "Location" is transformed (e.g., by one or more first machine learning models) into an embedding [0.0, 0.9, 0.0]. In FIG. 8, a non-limiting example of the set 808 of entities includes "Person Name," "Physical Address," and "Email Address." In this example, the embedding [0.0, 0.9, 0.0] means the ML portion of the metadata classifier functionality 138 determined the field named "Location" has a 0% chance of belonging to the entity "Person Name," 90% chance of belonging to the entity "Physical Address," and a 0% chance of belonging to the entity "Email Address." In this example, the embeddings 806 may be characterized as being field-level embeddings because each of the embeddings 806 corresponds to one of the fields 804. The embeddings (e.g., the embeddings 806) can be obtained using one or more of the metadata classifier(s) 212 (e.g., first machine learning model(s) 814), which can be implemented as at least one machine learning model, such as one or more transformers, one or more BERT models, one or more neural networks, one or more LLMs, and/or the like.

Then, the ML portion of the metadata classifier functionality 138 combines the embeddings 806 to obtain schema-level embeddings 810. In at least one embodiment, the schema-level embeddings 810 are computed by selecting a maximum probability for each entity. For example, in FIG. 8, for all of the fields 804, 100% is the maximum probability a field (e.g., the field named "Cust_First_Name") belongs to the entity "Person Name," 90% is the maximum probability a field (e.g., the field named "Location") belongs to the entity "Physical Address," and 10% is the maximum probability a field (e.g., each of the fields named "Cust_First_Name," "Cust_Last_Name," and TimeStamp) belongs to the entity "Email Address." Thus, in FIG. 8, the schema-level embeddings 810 are [1.0, 0.9, 0.1].

The ML portion of the metadata classifier functionality 138 classifies the schema-level embeddings 810 (which serve as inputs to the metadata classifier(s) 212) into at least one of the data classes in the set 204. For example, in FIG. 8, the schema-level embeddings 810 (e.g., [1.0, 0.9, 0.1]) are classified into a schema classification 812 that is [0.99, 0.0, 0.0], which means the metadata classifier(s) 212 determined there is a 99% chance that the schema 802 belongs to the PII class, and 0% chances the schema 802 belongs to the non-PII class or the other class. The ML portion of the metadata classifier functionality 138 may classify the schema 802 in the data class for which the schema classification 812 has the largest value, which in this example is the PII class. In at least one embodiment, the ML portion of the metadata classifier functionality 138 returns an error or no classification if the schema classification 812 does not include a value that exceeds a minimum threshold value. The schema-level embeddings (e.g., the schema-level embeddings 810) can be classified using the metadata classifier(s) 212 (e.g., second machine learning model(s) 816), which can be implemented as at least one machine learning model, such as one or more transformers, one or more BERT models, one or more neural networks, one or more LLMs, and/or the like.

Figure 9:
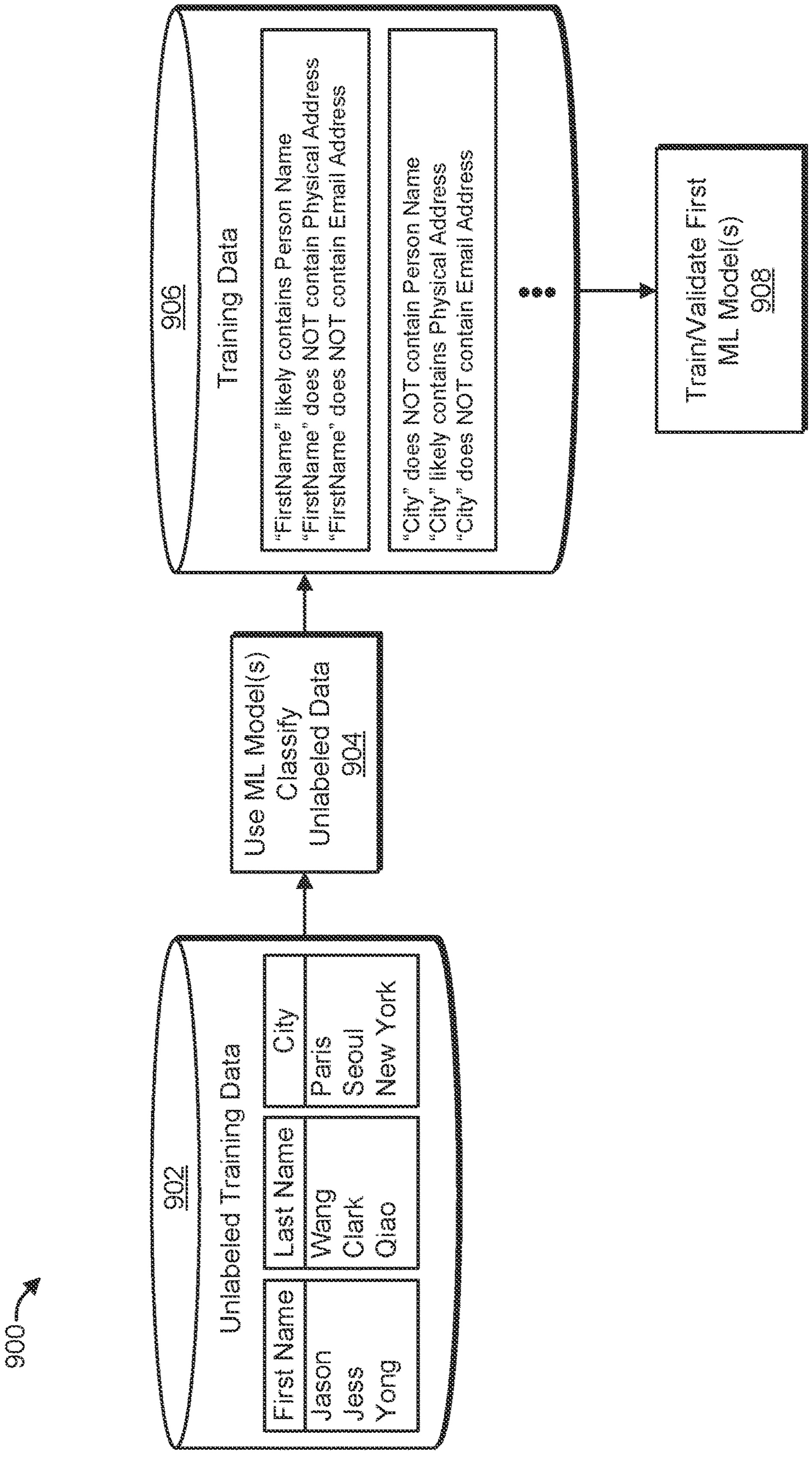
FIG. 9 illustrates a block diagram illustrating an example process of training one or more machine learning models, in accordance with at least one embodiment.

FIG. 9 illustrates a block diagram illustrating an example process 900 of training one or more machine learning models, in accordance with at least one embodiment. In at least one embodiment, the ML portion of the metadata classifier functionality 138 performs the process 900 and uses the process 900 to train the first machine learning model(s) 814. For example, the first machine learning model(s) 814 (e.g., a transformer model, such as a BERT transformer) can be trained and/or fine-tuned to map the names of the fields 804 (see FIG. 8) in the schema 802 (see FIG. 8) to entity probabilities (e.g., embeddings 806). The first machine learning model(s) 814 may be trained and/or may perform inferences using cross-entropy loss or a cross-entropy loss function. The process 900 starts with unlabeled training data 902. In the example illustrated, the unlabeled training data 902 includes datasets (or fields) and their values. Each of the fields also include a field name. At block 904, the ML portion of the metadata classifier functionality 138 uses one or more ML models (e.g., classifiers) to label the field names with entities by scanning the actual values. For example, a ML model (referred to as the Person Name entity classifier) may classify the field names as being or not being a Person Name entity. For example, the Person Name entity classifier can scan the field "FirstName" and identify "Jason" as being a Person Name entity. The ML model(s) used in block 904 may include one or more transformers, one or more BERT models, one or more neural networks, one or more LLMs, and/or the like. After block 904, the ML portion of the metadata classifier functionality 138 labels the field name "FirstName" with "Person Name" and adds the field name "FirstName" and its associated label "Person Name" to training data 906. Mapping the field names to the entities can help generalize the first and/or second machine learning model(s) 814 and 816 and can help provide an interpretable explanation as to why something is classified in a particular data class. Then, at block 908, the ML portion of the metadata classifier functionality 138 may use the training data 906 to train the first machine learning model(s) 814.

Figure 10:
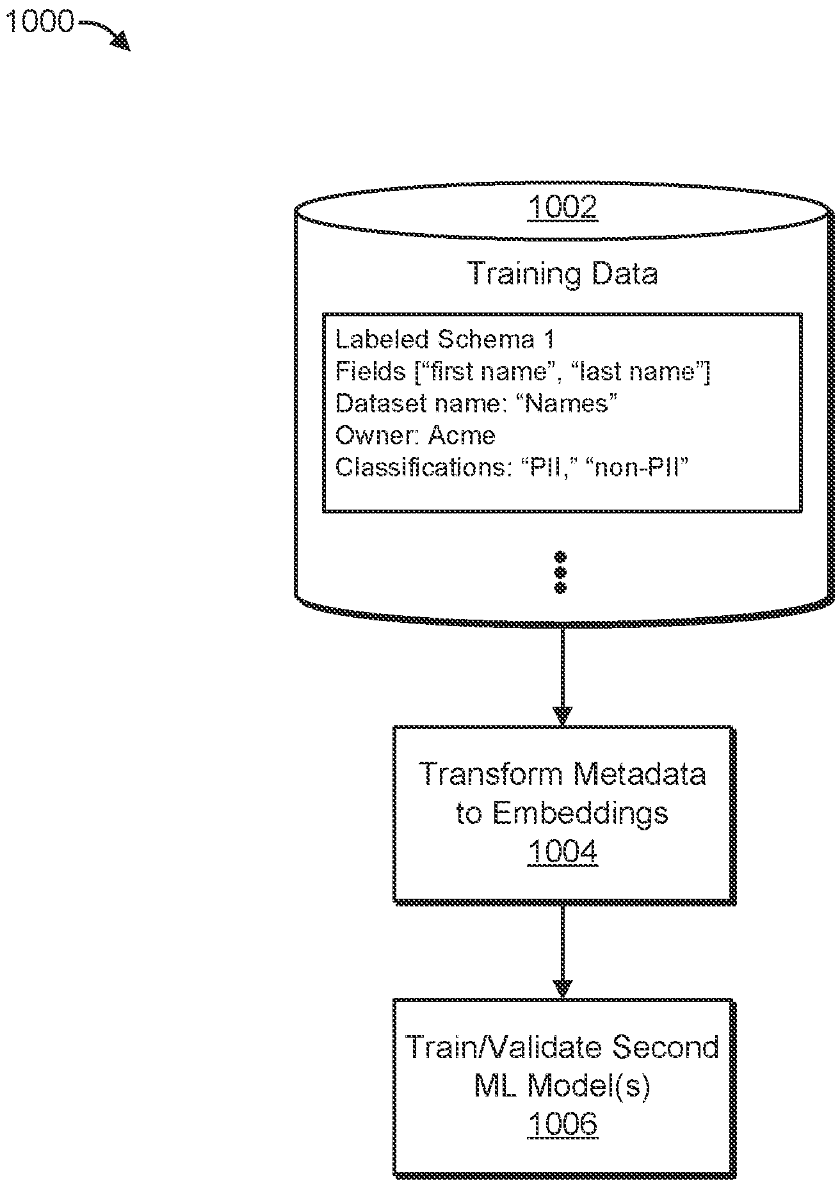
FIG. 10 illustrates a block diagram illustrating an example process of training one or more machine learning models, in accordance with at least one embodiment.

FIG. 10 illustrates a block diagram illustrating an example process 1000 of training one or more machine learning models, in accordance with at least one embodiment. In at least one embodiment, the ML portion of the metadata classifier functionality 138 performs the process 1000 and uses the process 1000 to train and/or fine-tune the second machine learning model(s) 816. For example, the second machine learning model(s) 816 (e.g., a transformer model, such as a BERT transformer) can be trained and/or fine-tuned to classify the schema-level embedding 810 (see FIG. 8) in one of the data classes in the set 204 (see FIGS. 2 and 8). The second machine learning model(s) 816 may be trained and/or may perform inferences using Logistic Regression, Random Forest, and/or the like. The process 1000 starts with labeled training data 1002. In the example illustrated, the labeled training data 1002 includes field names (e.g., "first name" and "last name") associated with data classes (e.g., PII or non-PII). At block 1004, the ML portion of the metadata classifier functionality 138 uses the first machine learning model(s) 814 to determine the embeddings (e.g., embeddings 806) for the field names. Then, the ML portion of the metadata classifier functionality 138 uses the embeddings obtained at block 1004 to obtain a schema-level embedding (e.g., the schema-level embedding 810) and, at block 1006, uses the schema-level embedding to train the second machine learning model(s) 816. The second machine learning model(s) 816 can be fine-tuned using the process 1000 to optimize one or more customer specified metrics, such as accuracy, precision, recall, and/or any other metric.

In at least one embodiment, the metadata classifier(s) 212 include(s) one or more overall classifiers that combine(s) any rule-based classifications (e.g., determined using exact and/or fuzzy matching and) generated by the rule-based portion of the metadata classifier functionality 138 with any classifications generated by the ML portion of the metadata classifier functionality 138 (supervised learning). For example, the ML portion of the metadata classifier functionality 138 can use machine learning model(s) 814 and 816 to obtain a first set of probabilities that indicate likelihoods that a piece of metadata (e.g., a set of data items) belongs to each data class in the set 204, the rule-based portion of the metadata classifier functionality 138 can optionally determine (e.g., using exact and/or fuzzy matching) to which data class in the set 204 the piece of metadata belongs, which can be expressed as a second set of probabilities, and the overall classifier(s) can combine the first and second sets of probabilities to obtain a third set of probabilities that is included in the classified metadata 214 as the data classification. The overall classifier(s) may be implemented using one or more transformers, one or more BERT models, one or more neural networks, one or more LLMs, and/or the like.

Figure 11:
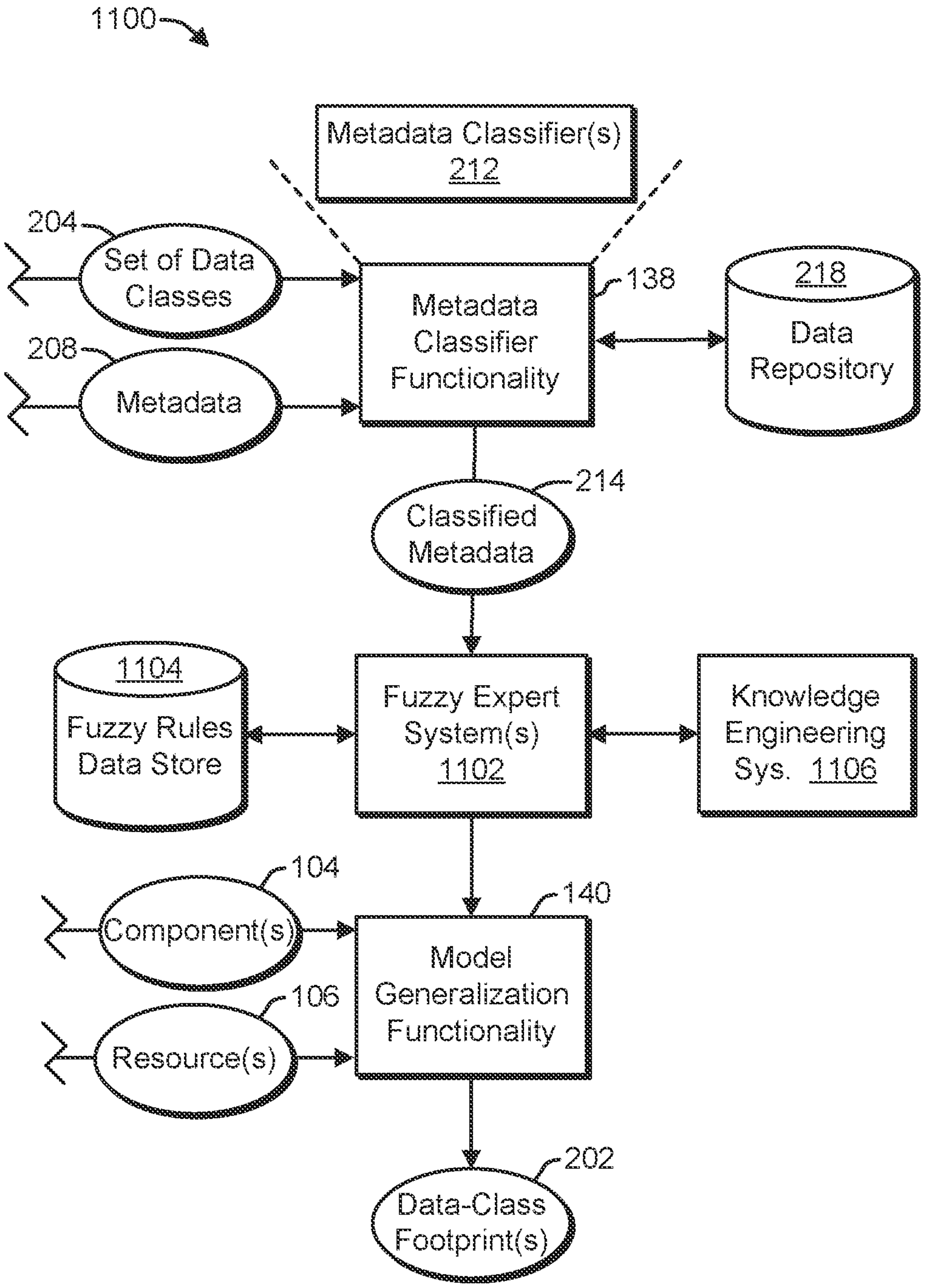
FIG. 11 illustrates a block diagram depicting an example data flow in which information flows through fuzzy expert process(es) and/or system(s), in accordance with at least one embodiment.

In at least one embodiment, accuracy of the ML portion of the metadata classifier functionality 138 is improved by one or more fuzzy expert processes or systems. FIG. 11 illustrates a block diagram depicting an example data flow 1100 in which information flows through one or more fuzzy expert processes or systems 1102, in accordance with at least one embodiment. The fuzzy expert system(s) 1102 can be particularly helpful when specialized expert knowledge and/or expertise can be used to enhance the accuracy of the classified metadata 214 produced by the metadata classifier functionality 138. In at least one embodiment, the footprinting functionality 110 implements the fuzzy expert system(s) 1102. The fuzzy expert system(s) 1102 use fuzzy rules (e.g., stored in a fuzzy rule data store 1104) created using expert knowledge and/or expertise. The classified metadata 214 produced by the metadata classifier functionality 138 serves as fuzzy inputs for fuzzy inference mechanism(s) of the fuzzy expert system(s) 1102, which can be further refined by additional fuzzy inputs contributed by experts (e.g., employing a knowledge and fuzzy rules engineering approach). For example, the set 204 of data classes can include PII and non-PII and the ML portion of the metadata classifier functionality 138 can output a data classification [0.45, 0.55], meaning the ML portion of the metadata classifier functionality 138 determined there is a 45% chance the corresponding metadata belongs to the PII class and a 55% chance the corresponding metadata belongs to the non-PII class. Thus, the data classification [0.45, 0.55] is nearly evenly split between two different classifications, meaning the metadata classifier functionality 138 did not output a clear classification. This data classification can be used as fuzzy input to the fuzzy expert system(s) 1102. The fuzzy expert system(s) 1102 can also receive other fuzzy input (e.g., fuzzy values) identified by a knowledge engineering process or system 1106. The fuzzy expert system(s) 1102 can apply the other fuzzy input to the data classification [0.45, 0.55], and output a refined data classification [0.2, 0.8]. In this example, the refined data classification [0.2, 0.8] clearly favors the corresponding metadata belonging to the non-PII class. In at least one embodiment, the foot-printing functionality 110 implements the knowledge engineering system 1106.

The data repository 218 and/or the fuzzy rule data store 1104 may be implemented using one or more data stores, one or more databases, memory, and/or the like.

Accuracy of the metadata classifier(s) 212, the tolerable false positives versus false negatives, and the ML approaches used can be determined based at least in part on context of the data-class foot-printing being performed. The metadata classifier functionality 138 can output data classes for the resource(s) 106 along with their associated metadata and their associated data class(es). The metadata classifier functionality 138 provides this output (e.g., including the classified metadata 214) to the model generalization functionality 140.

The model generalization functionality 140 abstracts the output received from the metadata classifier functionality 138. For example, the model generalization functionality 140 can abstract the resource(s) 106 and their behavior in a way that signifies their impact on different data classes of the set 204. The model generalization functionality 140 produces the data-class footprint(s) 202. The model generalization functionality 140 can include an ensemble classifier to deduce data classes given their associated metadata and context from surrounding metadata. The deduced schemas and their structural connections established via identified service calls offer supplementary contextual information that can be used to improve the accuracy of the metadata classifier(s) 212. The machine learning models (e.g., the metadata classifier(s) 212) can be fine-tuned.

Figure 4:
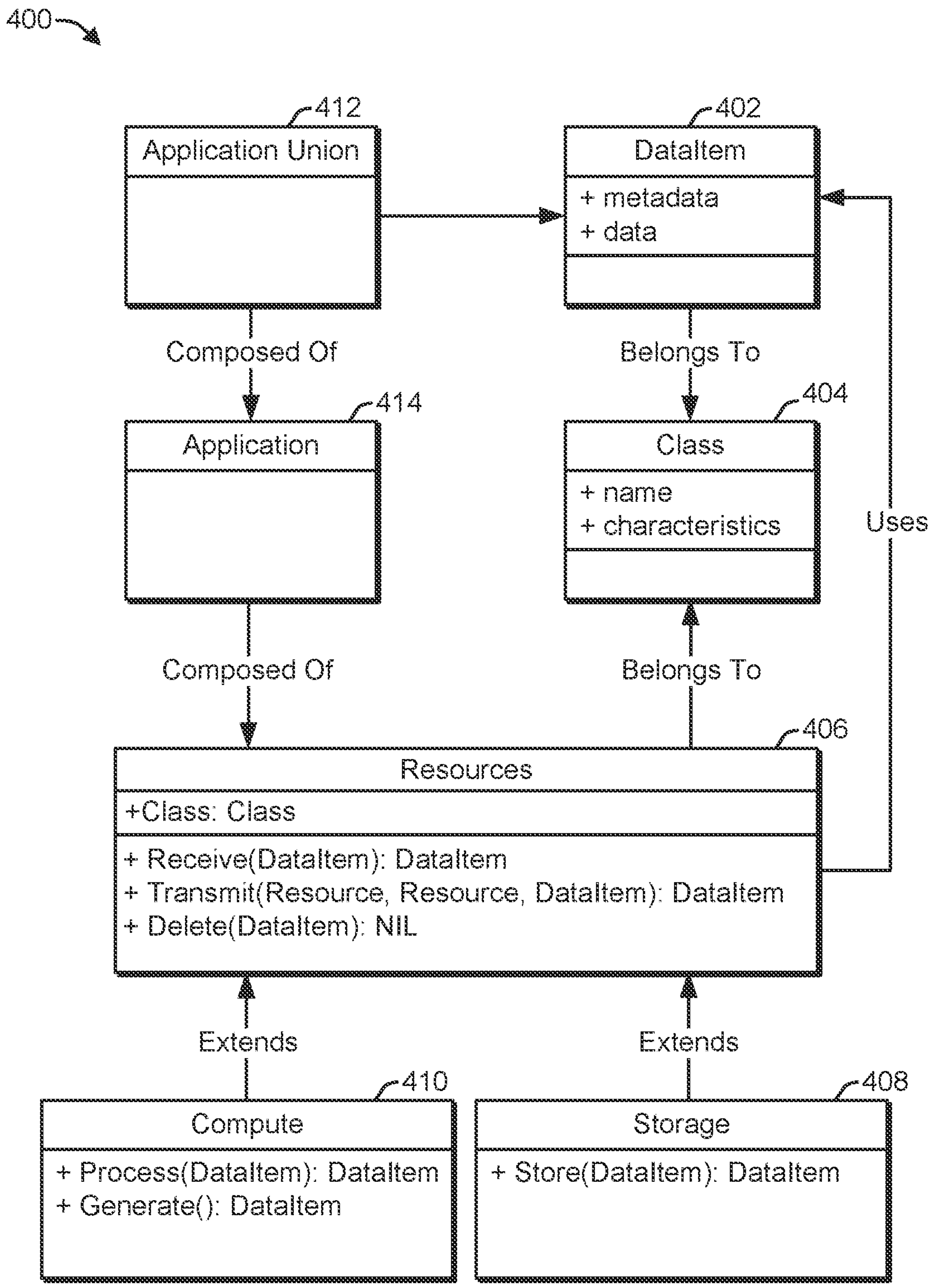
FIG. 4 illustrates a block diagram illustrating a conceptual meta-model depicting components involved in performing data footprint functionality, in accordance with at least one embodiment.

FIG. 4 illustrates a block diagram illustrating a conceptual meta-model 400 depicting components involved in performing the foot-printing functionality 110, in accordance with at least one embodiment. The data used to perform the computing objective(s) 216 can be represented as a DataItem class 402 that has a metadata property and a data property. The metadata property includes the metadata associated with the data (e.g., data formats and data identifiers) and the data property includes the data values, which as explained herein, are generated at runtime and are not needed to generated the data-class footprint(s) 202. Each DataItem class 402 belongs to at least one Class class 404. The meta-model 400 includes a Class class 404 for each of the data classes in the set 204, which, for example, can have been pre-defined by one or more users. Each Class class 404 includes a name property and a characteristics property.

The meta-model 400 includes a Resource class for each of the resource(s) 106, which are depicted as Resources class 406. The Resources class 406 includes a Class property, a Receive function, a Transmit function, and a Delete function. Using these functions, resource types can receive, transmit, and delete data. Each Resources class 406 can be one of two types, compute and storage. A Storage class 408 represents a storage resource that can persist data (e.g., using a Store function). A Compute class 410 represents a compute resource that can process data (e.g., using a Generate function and/or a Process function).

A Receive function receives data, for example, at a boundary of a system (e.g., boundary of an Application Union) or from another internal technical component. The Receive function can receive the data at a boundary of a system from an agent that can be a technical component or social component (e.g., a human user) via a graphical user interface (GUI). A Transmit function sends data from a first resource to a second resource without modifying the data. A Process function converts data into other data (e.g., new data can be created that is of a different type or the same type). A Store function persists data. A Generate function generates new data (e.g., new data is not a derivation of other data). A Delete function deletes the data logically and/or physically.

The meta-model 400 includes an Application Union 412 (e.g., the component(s) 104) and interacts with the data represented by the DataItem class 402. The meta-model 400 includes an Application class 414 for each application. Thus, the Application Union 412 is composed of at least one Application class 414. Each Application class 414 is composed of the Resources class 406. An example of such a structure is depicted by FIG. 3, which illustrates, the Application Union X including the Applications A-D, which include the resources X1S, X1C, X2S, X2C, X3C, Y1S, Y1C, Y2C, Z1C, Z1S and Z2S.

The foot-printing functionality 110 identifies the component(s) 104 (e.g., Application Union) under investigation, identifies the set 204 of data classes to which data belong, identifies the resource(s) 106 that interact with the data, and infers one or more functions (e.g., Receive, Transmit, Process, Store, and/or Generate) the resource(s) 106 apply to the data. For example, the model generalization functionality 140 can simplify interaction between the resource(s) 106 by inferring each of their communications is one of a set of functions (e.g., Receive, Transmit, Process, Store, and/or Generate) involving one or more of the data classes in the set 204.

Figure 5:
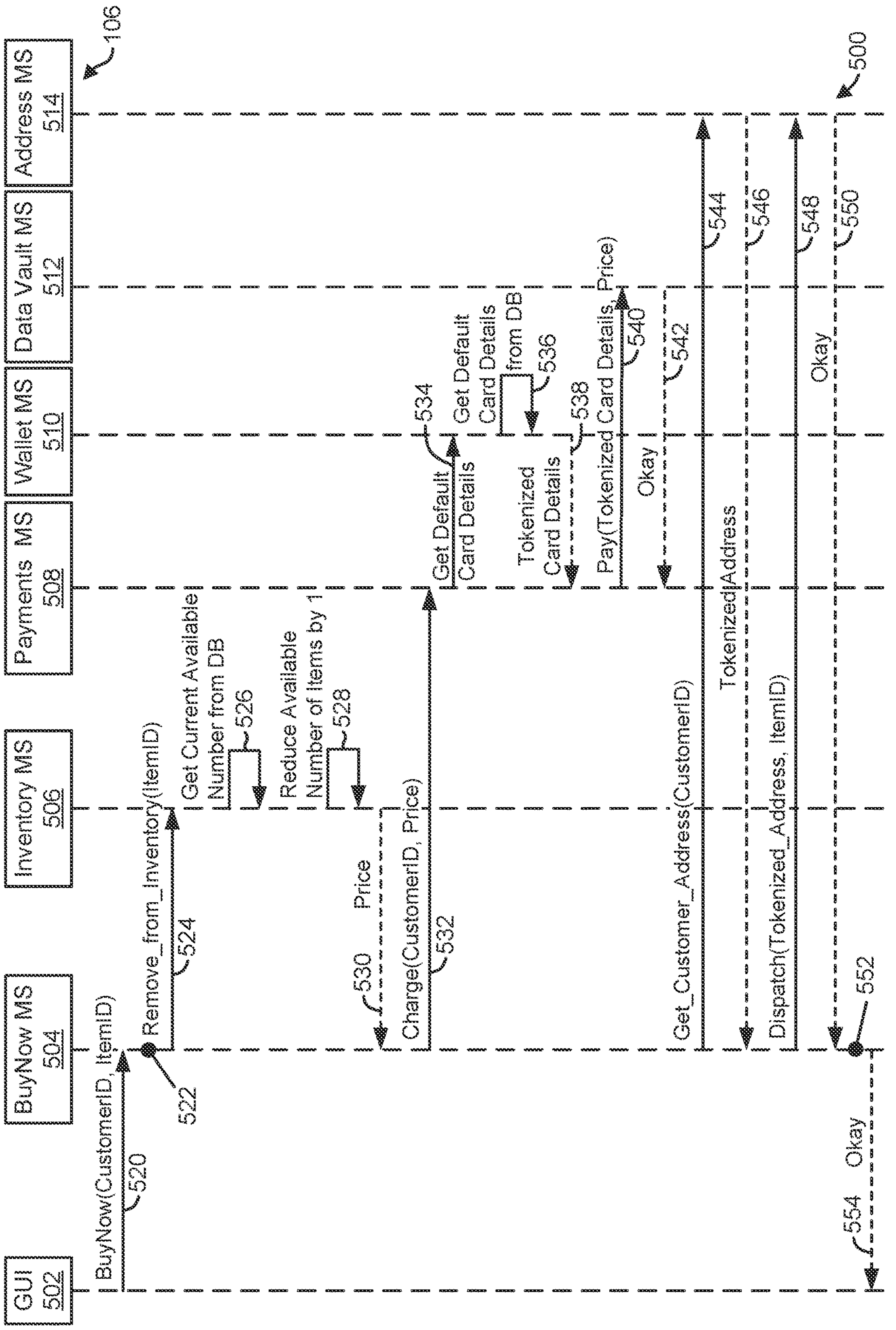
FIG. 5 illustrates a sequence diagram depicting examples of communications between examples of components of an information computing system when the information computing system is performing an example computing objective, in accordance with at least one embodiment.

FIG. 5 illustrates a sequence diagram 500 depicting examples of communications between examples of some of the resource(s) 106 of the information computing system 102 (see FIG. 1) when the information computing system 102 is performing an example computing objective, in accordance with at least one embodiment. Byway of a non-limiting example, in FIG. 5, the resource(s) 106 are depicted as including a BuyNow micro-service ("MS") 504, an inventory MS 506, a payments MS 508, a wallet MS 510, a data vault MS 512, and an address MS 514. However, the resource(s) 106 may include other resources and may exclude any of the resources depicted in FIG. 5. In FIG. 5, the information computing system 102 is performing a transaction in which a customer is purchasing an item, referred to as a "BuyNow" transaction, which in this example, is the computing objective. The sequence diagram 500 depicts communications between the GUI 502, the BuyNow micro-service ("MS") 504, the inventory MS 506, the payments MS 508, the wallet MS 510, the data vault MS 512, and the address MS 514, when these resources are performing the BuyNow transaction. For ease of illustration, the MSs 504-514 will be described as being member of an Application Union (e.g., the Application Union X depicted in FIG. 3).

Data enters the Application Union as a function call 520 ("BuyNow(CustomerID, ItemID)") received from the GUI 502 (e.g., operated by a customer). This function call 520 has two parameters, CustomerID and ItemID. At point 522, a new transaction begins. The BuyNow MS 504 receives the function call 520, and in response, issues a function call 524 ("Remove_from_Inventory(ItemID)") to the inventory MS 506. This function call 524 has a single parameter, ItemID. The inventory MS 506 accesses an inventory database to obtain 526 a number of products associated with the ItemID that are currently available and reduces 528 that number by one in the inventory database. Next, the inventory MS 506 forwards (operation 530) the price of the product associated with the ItemID to the BuyNow MS 504. The BuyNow MS 504 receives the price, and in response, issues a function call 532 ("Charge(CustomerID, Price)") to the payments MS 508. This function call 532 has two parameters, CustomerID and Price. The payments MS 508 receives the function call 532, and in response, issues (operation 534) a request to the wallet MS 510 for default credit card details. The wallet MS 510 accesses a wallet database to obtain (operation 536) the credit card details, and forward 538 a tokenized version of the credit card details to the payments MS 508. In response, the payments MS 508 issues a function call 540 ("Pay (Tokenized Card Details, Price)") to the data vault MS 512. This function call 540 has two parameters, Tokenized Card Details and Price. In response, the data vault MS 512 sends an acknowledgement 542 ("Okay") to the payments MS 508.

The BuyNow MS 504 issues a function call 544 ("Get_Customer_Address(CustomerID))") to the address MS 514. This function call 544 has a single parameter, CustomerID. In response, the address MS 514 forwards (operation 546) a tokenized version of the address to the BuyNow MS 504. The BuyNow MS 504 issues a function call 548 ("Dispatch(Tokenized_Address, ItemID))") to the address MS 514. This function call 548 has two parameters, Tokenized_Address and ItemID. In response, the address MS 514 sends an acknowledgement 550 ("Okay") to the BuyNow MS 504. At point 552, the transaction ends. The BuyNow MS 504 sends an acknowledgement 554 ("Okay") to the GUI 502 (e.g., for display to the customer).

After a user and/or an automated process selects, the BuyNow transaction as the computing objective for which one or more data-class footprints is/are to be generated, the data classes and those of the component(s) 104 involved in performing the computing objective are determined. In this example, the set 204 of data classes include a PII class and a non-PII class. In this example, CustomerID is PII, and ItemID, ItemPrice, ItemInventory, TokenisedCardDetails, and TokenisedAddress are non-PII. Thus, the data class identifier functionality 130 obtains the PII and non-PII classes. The scope identifier functionality 132 identifies those component(s) involved in performing the BuyNow transaction. In this example, the scope identifier functionality 132 identifies the component(s) 104 (e.g., an Application Union) including the resource(s) 106, which, in this example, correspond to the MSs 504-514. Then, the resource extraction functionality 134 uses the component(s) 104 to obtain the resource(s) 106 (e.g., the MSs 504-514). In this example, the resource extraction functionality 134 obtains the MSs 504-514 and an Inventory database (DB), a Wallet DB, a DataVault DB, and an Address DB used by the inventory MS 506, the wallet MS 510, the data vault MS 512, and the address MS 514, respectively. As demonstrated by FIG. 5, metadata can be obtained using communications between the resource(s) 106 and without using any actual system data 108.

The schema inference functionality 136 infers the schema(s) 226, for example, using the function calls and other data transfers and/or accesses depicted in FIG. 5. For example, the schema inference functionality 136 can infer database schemas for the Inventory DB, the Wallet DB, the DataVault DB, and the Address DB. The schema inference functionality 136 can transform the schema(s) 226 (e.g., using an encoder, a machine learning encoder, and/or the like) into a canonical format (e.g., a vector format). The schema inference functionality 136 can include the schema(s) 226 in the metadata 208 that the schema inference functionality 136 provides to the metadata classifier functionality 138. The information used to obtain these schemas can have been obtained from a service contract, which can specify data to be communicated with a particular database. The schema inference functionality 136 can extract information related to data items from the schema(s) 226 and include the information in the metadata 208 that the schema inference functionality 136 provides to the metadata classifier functionality 138.

The metadata classifier functionality 138 classifies the metadata into the data classes of the set 204, and provides the classified metadata to the model generalization functionality 140. In this example, the metadata classifier functionality 138 classifies the CustomerTD as belonging to the PN class, and classifies the ItemD, ItemPrice, ItemInventory, TokenisedCardDetails, and TokenisedAddress as belonging to the non-PII class.

The model generalization functionality 140 generalizes the function calls of FIG. 5 to one of the set of functions (e.g., Receive, Transmit, Process, Store, and/or Generate) and includes the data class along with or in place of the function parameters. For example, a righthand column of Table A below depicts example generalization of function calls and/or operations output by the model generalization functionality 140 with respect to function calls to or from the BuyNow MS 504 shown in the lefthand column:

| Function Call/Operation | Translated to Data-Class Footprint |
|---|---|
| BuyNow(CustomerID, ItemID) (function call 520) | Receive(CustomerID[PII]) |
| BuyNow(CustomerID, ItemID) (function call 520) | Receive(ItemID[non-PII]) |
| Remove_from_Inventory(ItemID) (function call 524) | Transmit(BuyNow, Inventory, ItemID[non-PII]) |
| Price (operation 530) | Receive(ItemPrice[non-PII]) |
| Charge(CustomerID, Price) (function call 532) | Transmit(BuyNow, Payment, CustomerID[PII]) |
| Charge(CustomerID, Price) (function call 532) | Transmit(BuyNow, Payment, ItemPrice[non-PII]) |
| Get_Customer_Address(CustomerID) (function call 544) | Transmit(BuyNow, Address, CustomerID[PII]) |

-continued

| Function Call/Operation | Translated to Data-Class Footprint |
|---|---|
| Tokenized Address (operation 546) | Receive(TokenisedAddress[non-PII]) |
| Dispatch(Tokenized_Address, ItemID) (function call 548) | Transmit(BuyNow, DataVault, TokenisedAddress[non-PII]) |
| Dispatch(Tokenized_Address, ItemID) (function call 548) | Transmit(BuyNow, DataVault, ItemID[non-PII]) |

The model generalization functionality 140 produces similar output with respect to the other resource(s) 106, namely, the MSs 506-514, the Inventor DB, the Wallet DB, the DataVault DB, and the Address DB. In this example, the data-class footprint(s) 202 include(s) the output generated by the model generalization functionality 140 for the MSs 504-514, the Inventor DB, the Wallet DB, the DataVault DB, and the Address DB.

Figure 6:
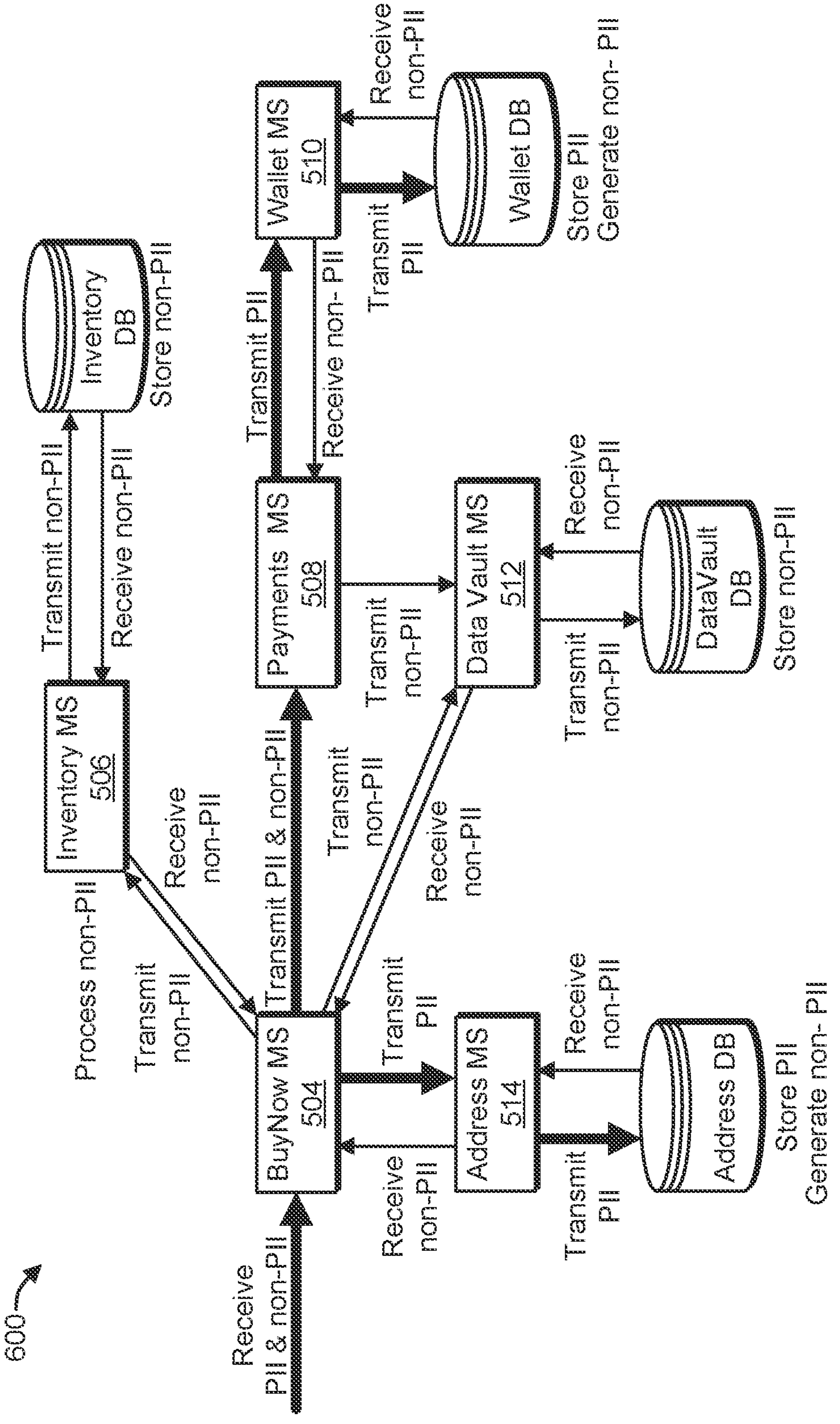
FIG. 6 illustrates an example visualization of a data-class footprint generated for the example computing objective of FIG. 5, in accordance with at least one embodiment.

FIG. 6 illustrates an example visualization of a data-class footprint 600 generated for the example computing objective (e.g., BuyNow transaction) of FIG. 5, in accordance with at least one embodiment. One or more security processes (e.g., performed by the security functionality 142) can use the data-class footprint 600 to take one or more actions to improve security with respect to the information computing system 102. In the example visualization of FIG. 6, thick bold arrows represent communications between two of the resource(s) 106 involving the PII class.

Because CustomerID was classified as PII, those communications in FIG. 5 (e.g., communications 520, 532, 534, and 544) that include CustomerID cause a link between resources in FIG. 6 to be classified as PII. Thus, the BuyNow MS 504, which received PII in function call 520 and transmitted PII in function calls 532 and 544, is illustrated as receiving and transmitting PII. Similarly, the payments MS 508, which received PII in function call 532 and transmitted PII at operation 534, is illustrated as receiving and transmitting PII. For the same reason, the Wallet MS 510, which received PII at operation 534, is illustrated as receiving PII, and the Address MS 514, which received PII in function call 544, is illustrated as receiving PI. Additionally, the Wallet MS 510 is depicted transmitting PII to the Wallet DB, which corresponds to operation 536, and the Address MS 514 is depicted transmitting PII to the Address DB, which is not depicted in FIG. 5.

FIG. 6 clearly illustrates those of the resource(s) 106 that interact with data belonging to the PII class. Thus, if the investigation is concerned with PII data, the analysis can be simplified by ignoring those of the resource(s) 106 not interacting with data belonging to the PII class.

Figure 12:
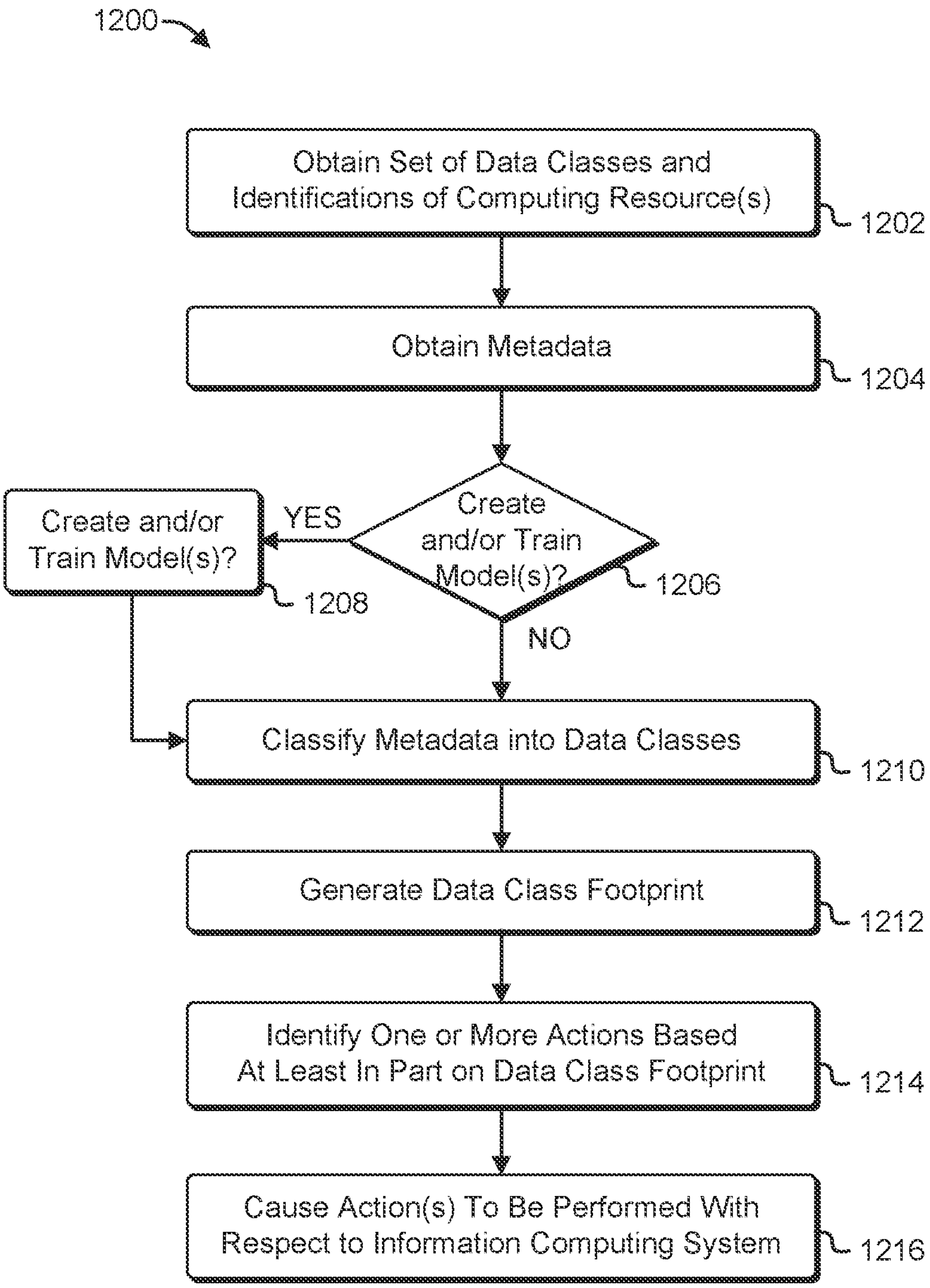
FIG. 12 illustrates a flow diagram of an example method of obtaining data-class footprint(s), in accordance with at least one embodiment.

FIG. 12 illustrates a flow diagram of an example method 1200 of obtaining the data-class footprint(s) 202 (see FIG. 2), in accordance with at least one embodiment. The method 1200 can be performed by the foot-printing functionality 110 (see FIG. 1) when the foot-printing functionality 110 is performed by the processor(s) 114 (see FIG. 1).

At first block 1202, referring to FIG. 2, the foot-printing functionality 110 (see FIG. 1) obtains the set 204 of data classes and identifications of the resource(s) 106 involved in performing the computing objective(s) 216. As explained herein, the data class identifier functionality 130 can obtain the set 204 of data classes, and the scope identifier functionality 132 can obtain the computing objective(s) 216 and the component(s) 104 involved in performing the computing objective(s) 216. Then, the resource extraction functionality 134 can identify the resource(s) 106 from the component(s) 104 identified by the scope identifier functionality 132.

Then, at block 1204 (see FIG. 12), the foot-printing functionality 110 (see FIG. 1) obtains the metadata 208. The metadata 208 can include the schema(s) 226 (e.g., in a canonical format) obtained by the schema inference functionality 136 and/or any types of metadata that can be inferred from the resource(s) 106 and/or data that is received, transmitted, deleted, processed, stored, and/or generated by the resource(s) 106. For example, the metadata 208 can include data formats and/or data identifiers of data involved in performing the computing objective(s) 216.

Then, at decision block 1206 (see FIG. 12), the foot-printing functionality 110 (see FIG. 1) decides whether to create and/or train one or more model(s) (e.g., the metadata classifier(s) 212) used to classify the metadata 208 into the data classes of the set 204. The decision at decision block 1206 is "YES," when the foot-printing functionality 110 decides to create and/or train the model(s) (e.g., one of the metadata classifier(s) 212). Otherwise, the decision at decision block 1206 is "NO." When the decision at decision block 1206 is "NO," the foot-printing functionality 110 advances to block 1210.

When the decision at decision block 1206 is "YES," at block 1208 (see FIG. 12), the foot-printing functionality 110 (see FIG. 1) creates and/or trains the model(s) used to classify the metadata 208 into the data classes of the set 204. Then, the foot-printing functionality 110 advances to block 1210.

When the decision at decision block 1206 is "NO," at block 1210 (see FIG. 12), the foot-printing functionality 110 (see FIG. 1) obtains the classified metadata 214 by classifying the metadata 208 into the data classes of the set 204. The foot-printing functionality 110 can use the metadata classifier(s) 212 to classify the metadata 208.

Then, at block 1212 (see FIG. 12), the foot-printing functionality 110 (see FIG. 1) outputs the data-class footprint(s) 202. At block 1212, the foot-printing functionality 110 (see FIG. 1) can generalize functions performed by the resource(s) 106 to simplify their relationships and/or indicate which of the data classes in the set 204 are involved in performing each of these functions.

At block 1214 (see FIG. 12), the foot-printing functionality 110 (see FIG. 1) identifies one or more action to improve security and/or performance related to the information computing system 102.

At block 1216 (see FIG. 12), the foot-printing functionality 110 (see FIG. 1) causes the action(s) identified in block 1214 to be performed with respect to the information computing system 102. The method 1200 can terminate after block 1216. While decision block 1206 is illustrated after the foot-printing functionality 110 obtains the metadata in block 1204, in at least one embodiment, the decision block 1206 can occur after block 1202. For example, the foot-printing functionality 110 may have training data 906 and/or 1002 but the set 204 of data classes may have changed. When this occurs, the model(s) (e.g., the metadata classifier(s) 212) may be trained for use with the new data classes. In at least one embodiment, the model(s) (e.g., the metadata classifier(s) 212) may be created and/or trained before the method 1200 is performed and/or during the performance of the method 1200. In at least one embodiment, the model(s) (e.g., the metadata classifier(s) 212) may be created and/or trained when new or different training data is obtained.

As one skilled in the art will appreciate in light of this disclosure, certain embodiments can be capable of achieving certain advantages, including some or all of the following: providing data-class footprints without accessing actual system data and/or by accessing only samples of unstructured data, which improves data security and/or privacy.

Figure 13:
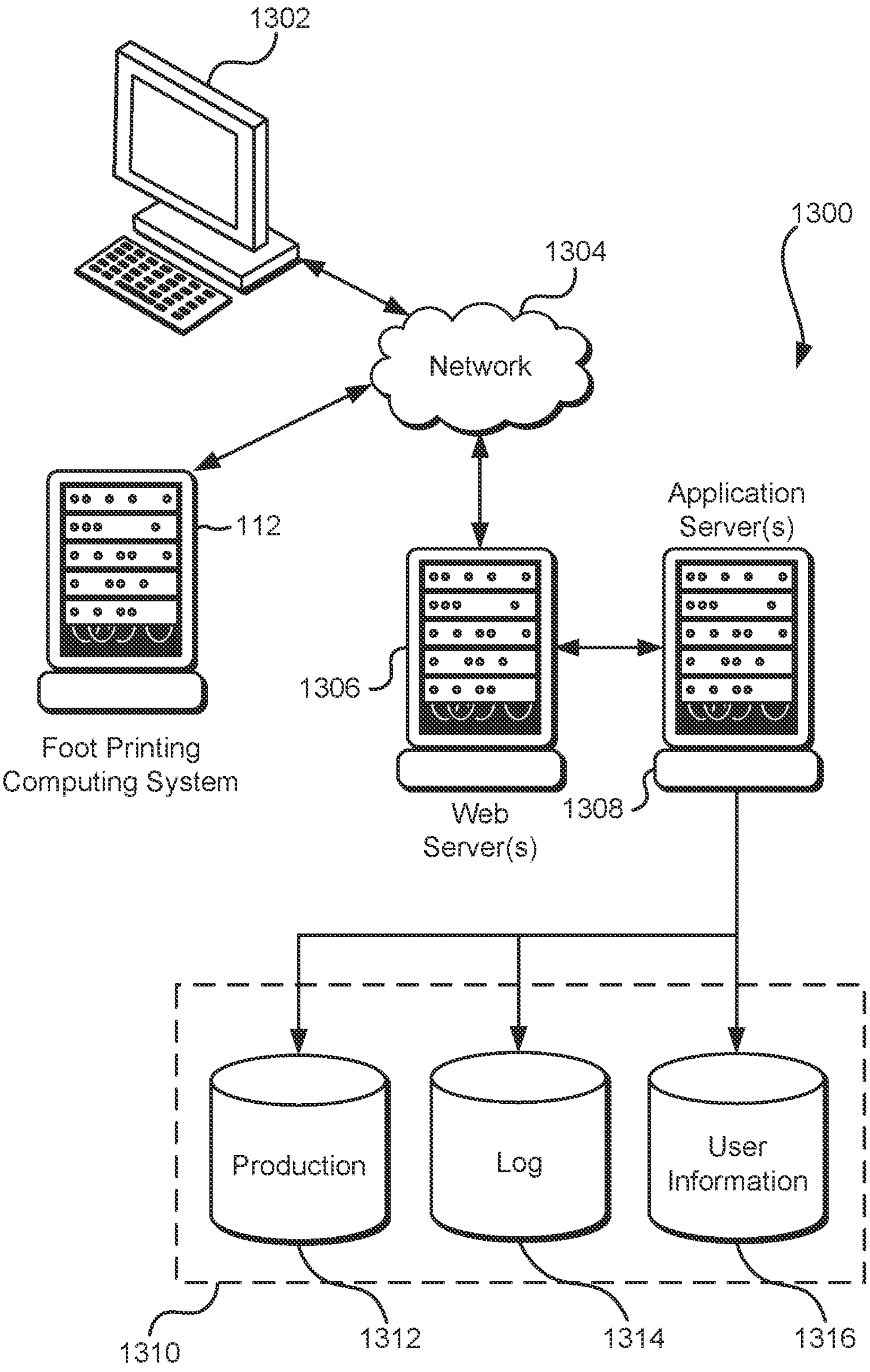
FIG. 13 illustrates a system in which various embodiments can be implemented.

FIG. 13 illustrates aspects of an example system 1300 for implementing aspects in accordance with an embodiment. In at least one embodiment, the system 1300 is used to implement at least a portion of the system 100. For example, the system 1300 can be used to implement the information computing system 102 and/or the foot-printing computing system 112. In at least one embodiment, the web server 1306, at least one application server 1308, and/or a data store 1310 may implement the information computing system 102 and/or the foot-printing computing system 112. For example, the foot-printing computing system 112 may be implemented by one or more computing devices connected to a network 1304 by a wired or wireless connection and the web server 1306, the application server(s) 1308, and/or the data store 1310 may implement the information computing system 102.

As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1302 and the application server 1308, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto, and the application server 1308 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

At least one embodiment of the disclosure can be described in view of the following clauses:

1. A computer-implemented method, comprising: obtaining metadata related to performance of at least one computing objective by a computing system; generating classified metadata using at least one machine learning process to classify the metadata into a plurality of data classes; and generating at least one data-class footprint based at least in part on the classified metadata.

2. The computer-implemented method of clause 1, wherein the metadata comprises a database schema, and generating the classified metadata comprises: using a first one of the at least one machine learning process to determine likelihoods that fields in the database schema belong to a set of entities; determining an encoding using the likelihoods; and using a second one of the at least one machine learning process to classify the encoding into at least one of the plurality of data classes.

3. The computer-implemented method of clause 1 or 2, wherein the at least one data-class footprint indicates which of at least one resource used by the computing system to perform the at least one computing objective perform at least one of a predetermined set of functions with respect to at least one class of the plurality of data classes.

4. The computer-implemented method of any one of clauses 1-3, further comprising: using one or more of the at least one data-class footprint to determine an action to improve security within the computing system.

5. The computer-implemented method of any one of clauses 1-4, wherein the metadata is obtained without the at least one computing objective actually performing the computing system.

6. A system, comprising: one or more processors; memory that stores computer-executable instructions that, if executed, cause the one or more processors to: obtain metadata related to performance of at least one computing objective; and generate at least one data-class footprint based at least in part on classification of the metadata into a set of data classes.

7. The system of clause 6, wherein the metadata is obtained without using data obtained based at least in part on an actual performance of the at least one computing objective by a computing system.

8. The system of clause 6 or 7, wherein the metadata comprises a schema, and the computer-executable instructions, if executed, cause the one or more processors to:

use at least one machine learning process to infer the schema using a sample of unstructured data.

9. The system of any one of clauses 6-8, wherein the computer-executable instructions, if executed, cause the one or more processors to:

identify one or more resources of a computing system to perform the at least one computing objective, the at least one data-class footprint to indicate which of the one or more resources is to perform at least one of a predetermined set of functions with respect to at least one class of the set of data classes.

10. The system of any one of clauses 6-9, wherein the computer-executable instructions, if executed, cause the one or more processors to: classify the metadata into the set of data classes, the metadata to comprise a database schema; use a first machine learning process to determine an encoding of the database schema based at least in part on likelihoods that fields in the database schema belong to a set of entities; and use a second machine learning process to classify the encoding into at least one class of the set of data classes.

11. The system of any one of clauses 6-10, wherein the computer-executable instructions, if executed, cause the one or more processors to: determine a data item belongs to a particular class of the set of data classes; and classify one or more schemas in the metadata in the particular class based at least in part on at least one similarity score calculated based at least in part on a name of the data item and at least one field name in the one or more schemas.

12. The system of any one of clauses 6-11, wherein the computer-executable instructions, if executed, cause the one or more processors to: determine a data item belongs to a particular class of the set of data classes; classify one or more schemas in the metadata in the particular class based at least in part on at least one similarity score calculated based at least in part on a name of the data item and at least one field name in the one or more schemas; use at least one machine learning process to determine at least one encoding of any unclassified schemas in the metadata based at least in part on likelihoods that fields in the unclassified schemas belong to a set of entities; and use the at least one machine learning process to classify the at least one encoding into at least one class of the set of data classes.

13. The system of any one of clauses 6-12, wherein the computer-executable instructions, if executed, cause the one or more processors to: use one or more of the at least one data-class footprint to determine an action to improve security within a computing system to perform the at least one computing objective.

14. A non-transitory computer-readable storage medium storing thereon executable instructions that, as a result of being executed by one or more processors of a computer system, cause the computer system to at least: generate at least one data-class footprint based at least in part on classification of at least one schema related to performance of one or more computing objective into one or more data classes.

15. The non-transitory computer-readable storage medium of clause 14, wherein the instructions further comprise instructions that, as a result of being executed by the one or more processors, cause the computer system to: identify one or more resources of a computing system to perform the at least one computing objective, the at least one data-class footprint to indicate which of the one or more resources is to perform at least one of a predetermined set of functions with respect to at least one class of the one or more data classes.

16. The non-transitory computer-readable storage medium of clause 14 or 15, wherein the instructions further comprise instructions that, as a result of being executed by the one or more processors, cause the computer system to classify the at least one schema into one or more data classes by: using a first machine learning process to determine an encoding of the at least one schema based at least in part on likelihoods that fields in the at least one schema belong to a set of entities; and using a second machine learning process to classify the encoding into at least one of the one or more data classes.

17. The non-transitory computer-readable storage medium of any one of clauses 14-16, wherein the instructions further comprise instructions that, as a result of being executed by the one or more processors, cause the computer system to: determine a data item belongs to a particular class of the one or more data classes; and classify any of the at least one schema comprising a field corresponding to the data item in the particular class.

18. The non-transitory computer-readable storage medium of any one of clauses 14-17, wherein the instructions further comprise instructions that, as a result of being executed by the one or more processors, cause the computer system to: determine a data item belongs to a particular class of the one or more data classes; and determine a particular field of the at least one schema corresponds to the data item based at least in part on a name of the particular field and a name of the data item.

19. The non-transitory computer-readable storage medium of any one of clauses 14-18, wherein the instructions further comprise instructions that, as a result of being executed by the one or more processors, cause the computer system to: obtain the at least one schema without using data obtained from an actual performance of the at least one computing objective by a computing system.

20. The non-transitory computer-readable storage medium of any one of clauses 14-19, wherein the instructions further comprise instructions that, as a result of being executed by the one or more processors, cause the computer system to: use at least one machine learning process to infer the at least one schema using a sample of unstructured data.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. Similarly, use of the term “or” is to be construed to mean “and/or” unless contradicted explicitly or by context. The terms “comprising,” “having,” “including,” and “containing” are to be construed as open-ended terms (i.e., meaning “including, but not limited to,”) unless otherwise noted. The term “connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term “set” (e.g., “a set of items”) or “subset” unless otherwise noted or contradicted by context, is to be construed as a nonempty collection comprising one or more members. Further, unless otherwise noted or contradicted by context, the term “subset” of a corresponding set does not necessarily denote a proper subset of the corresponding set, but the subset and the corresponding set may be equal. The use of the phrase “based on,” unless otherwise explicitly stated or clear from context, means “based at least in part on” and is not limited to “based solely on.”

Conjunctive language, such as phrases of the form “at least one of A, B, and C,” or “at least one of A, B and C,” (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases “at least one of A, B, and C” and “at least one of A, B and C” refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple “A”). Thus, such conjunctive language is not generally intended to imply that certain embodiments require at least one of A, at least one of B and at least one of C each to be present. Similarly, phrases such as “at least one of A, B, or C” and “at least one of A, B or C” refer to the same as “at least one of A, B, and C” and “at least one of A, B and C” refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:

identifying two or more computing resources of a computing system associated with performance of at least one computing objective:

identifying metadata related to performance of the at least one computing objective by the two or more computing resources;

inferring one or more data schemas associated with the two or more computing resources based on the obtained metadata;

generating classified metadata using at least one machine learning process to classify the metadata into a plurality of data classes; and generating at least one data-class footprint based at least in part on the one or more inferred data schemas and the classified metadata, the data-class footprint comprising an identification of one or more functions, performed by individual computing resources of the two or more computing resources, associated with individual data classes of the plurality of data classes.

2. The computer-implemented method of claim 1, wherein inferring the one or more data schemas comprises:

using a first one of the at least one machine learning process to determine likelihoods that fields in the one or more data schemas belong to a set of entities; and determining an encoding using the likelihoods; and wherein generating the classified metadata further comprises:

using a second one of the at least one machine learning process to classify the encoding into at least one of the plurality of data classes.

3. The computer-implemented method of claim 1, wherein the one or functions comprise one or more of receive, transmit, process, store, generate, or delete data.

4. The computer-implemented method of claim 1, further comprising:

using one or more of the at least one data-class footprint to determine an action to improve security within the computing system.

5. The computer-implemented method of claim 1, wherein the metadata is obtained without the at least one computing device performing the computing objective.

6. A system, comprising:
one or more processors;
memory that stores computer-executable instructions that, if executed, cause the one or more processors to:
identify two or more computing resources of a computing system associated with performance of at least one computing objective:
identify metadata related to performance of the at least one computing objective by the two or more computing resources;
generate classified metadata using at least one machine learning process to classify the metadata into a set of data classes; and
generate at least one data-class footprint based at least in part on the classified metadata, the data-class footprint comprising an identification of one or more functions, performed by individual computing resources of the two or more computing resources, associated with individual data classes of the set of data classes.

7. The system of claim 6, wherein the metadata is obtained without using data obtained based at least in part on an actual performance of the at least one computing objective by the computing system.

8. The system of claim 6, wherein the metadata comprises a schema, and the computer-executable instructions, if executed, cause the one or more processors to:
use at least one machine learning process to infer the schema using a sample of unstructured data.

9. The system of claim 6, wherein the computer-executable instructions, if executed, cause the one or more processors to:
identify one or more data classes of the set of data classes of interest based at least in part on the at least one computing objective.

10. The system of claim 6, wherein the metadata comprises a database schema and wherein the computer-executable instructions, if executed, cause the one or more processors to:
use a first machine learning process to determine an encoding of the database schema based at least in part on likelihoods that fields in the database schema belong to a set of entities; and
use a second machine learning process to classify the encoding into at least one class of the set of data classes.

11. The system of claim 6, wherein the computer-executable instructions, if executed, cause the one or more processors to:
determine that a data item belongs to a first class of the set of data classes; and
classify one or more schemas in the metadata in the first class based at least in part on at least one similarity score calculated based at least in part on a name of the data item and at least one field name in the one or more schemas.

12. The system of claim 6, wherein the computer-executable instructions, if executed, cause the one or more processors to:
determine that a data item belongs to a first class of the set of data classes;
classify one or more schemas in the metadata in the first class based at least in part on at least one similarity score calculated based at least in part on a name of the data item and at least one field name in the one or more schemas;
use at least one machine learning process to determine at least one encoding of any unclassified schemas in the metadata based at least in part on likelihoods that fields in the unclassified schemas belong to a set of entities; and
use the at least one machine learning process to classify the at least one encoding into at least one class of the set of data classes.

13. The system of claim 6, wherein the computer-executable instructions, if executed, cause the one or more processors to:
use one or more of the at least one data-class footprint to determine an action to improve security within the computing system to perform the at least one computing objective.

14. A non-transitory computer-readable storage medium storing thereon executable instructions that, as a result of being executed by one or more processors of a computer system, cause the computer system to at least:
identify two or more computing resources of a computing system associated with performance of at least one computing objective;
obtain metadata related to performance of the at least one computing objective by the two or more computing resources;
generate classified metadata using at least one machine learning process to classify the metadata into a one or more data classes; and
generate at least one data-class footprint based at least in part on the classified metadata, the data-class footprint comprising an identification of one or more functions, performed by individual computing resources of the two or more computing resources, associated with individual data classes of the set of data classes.

15. The non-transitory computer-readable storage medium of claim 14, wherein the instructions further comprise instructions that, as a result of being executed by the one or more processors, cause the computer system to:
identify one or more schemas from the metadata; and
generate the classified metadata further based on the one or more schemas.

16. The non-transitory computer-readable storage medium of claim 14, wherein the instructions further comprise instructions that, as a result of being executed by the one or more processors, cause the computer system to classify at least one schema identified from the metadata into one or more data classes by:
using a first machine learning process to determine an encoding of the at least one schema based at least in part on likelihoods that fields in the at least one schema belong to a set of entities; and
using a second machine learning process to classify the encoding into at least one of the one or more data classes.

17. The non-transitory computer-readable storage medium of claim 14, wherein the instructions further comprise instructions that, as a result of being executed by the one or more processors, cause the computer system to:
determine that a data item belongs to a first class of the one or more data classes; and
classify any of at least one schema comprising a field corresponding to the data item in the first class.

18. The non-transitory computer-readable storage medium of claim 14, wherein the instructions further comprise instructions that, as a result of being executed by the one or more processors, cause the computer system to:
determine that a data item belongs to a first class of the one or more data classes; and determine a first field of at least one schema corresponds to the data item based at least in part on a name of the first field and a name of the data item.

19. The non-transitory computer-readable storage medium of claim 14, wherein the instructions further comprise instructions that, as a result of being executed by the one or more processors, cause the computer system to:

obtain at least one schema without using data obtained from an actual performance of the at least one computing objective by computing system.

20. The non-transitory computer-readable storage medium of claim 14, wherein the instructions further comprise instructions that, as a result of being executed by the one or more processors, cause the computer system to:

use at least one machine learning process to infer at least one schema using a sample of unstructured data.

* * * * *